US011892377B2

(12) United States Patent
Kobayashi

(10) Patent No.: US 11,892,377 B2
(45) Date of Patent: Feb. 6, 2024

(54) TIME POINT ACQUISITION METHOD, TIME POINT ACQUISITION DEVICE, TIME POINT ACQUISITION SYSTEM, AND TIME POINT ACQUISITION PROGRAM

(71) Applicant: SEIKO EPSON CORPORATION, Tokyo (JP)

(72) Inventor: Yoshihiro Kobayashi, Komagane (JP)

(73) Assignee: SEIKO EPSON CORPORATION

( * ) Notice: Subject to any disclaimer, the term of this patent is extended or adjusted under 35 U.S.C. 154(b) by 0 days.

(21) Appl. No.: 17/852,583

(22) Filed: Jun. 29, 2022

(65) Prior Publication Data
US 2023/0003611 A1 Jan. 5, 2023

(30) Foreign Application Priority Data

Jun. 30, 2021 (JP) ................. 2021-108375

(51) Int. Cl.
*G01M 5/00* (2006.01)
(52) U.S. Cl.
CPC ........ *G01M 5/0066* (2013.01); *G01M 5/0008* (2013.01); *G01M 5/0033* (2013.01)
(58) Field of Classification Search
None
See application file for complete search history.

(56) References Cited

U.S. PATENT DOCUMENTS

2022/0383750 A1* 12/2022 Sharma Banjade ... G08G 1/005

FOREIGN PATENT DOCUMENTS

| JP | 6467304 B2 | 2/2019 |
| JP | 6543863 B2 | 7/2019 |

* cited by examiner

*Primary Examiner* — Raul J Rios Russo
*Assistant Examiner* — Carl F. R. Tchatchouang
(74) *Attorney, Agent, or Firm* — Harness, Dickey & Pierce, P.L.C.

(57) ABSTRACT

A time point is acquired by steps including a data acquisition step of acquiring time-series data indicating a time change of a displacement of a structure based on a physical quantity generated at a predetermined observation point in the structure as a response caused by a movement of a formation moving object formed with one or more moving objects on the structure; a removing step of removing a vibration component included in the time-series data; and a time point acquisition step of acquiring an entry time point at which the formation moving object enters the structure and an exit time point at which the formation moving object exits from the structure, based on the time-series data after the vibration component is removed.

19 Claims, 32 Drawing Sheets

TIME POINT ACQUISITION METHOD, TIME POINT ACQUISITION DEVICE, TIME POINT ACQUISITION SYSTEM, AND TIME POINT ACQUISITION PROGRAM

The present application is based on, and claims priority from JP Application Serial Number 2021-108375, filed Jun. 30, 2021, the disclosure of which is hereby incorporated by reference herein in its entirety.

BACKGROUND

1. Technical Field

The present disclosure relates to a time point acquisition method, a time point acquisition device, a time point acquisition system, and a time point acquisition program.

2. Related Art

In recent years, many social infrastructures have deteriorated over time, and there is a demand for a method for diagnosing a state of a structure constituting a social infrastructure such as a railway bridge.

JP-B-6543863 discloses a method for investigating structural performance of a railway bridge, which makes it possible to appropriately investigate and evaluate structural performance of a bridge by using observation data of acceleration response of the bridge during traveling of a train. In the method for investigating structural performance of a railway bridge according to JP-B-6543863, a theoretical analysis model of dynamic response of a railway bridge during traveling of a train is formulated using a train as a moving load train and a bridge as a simple beam, acceleration of the bridge during traveling of the railway train is measured, and unknown parameters of the theoretical analysis model are estimated from this acceleration data by a reverse analysis method.

JP-B-6467304 discloses a method for obtaining an impact coefficient (dynamic response component) of a bridge by using a vehicle vertical acceleration response of a traveling train particularly when the traveling train passes through the bridge.

In JP-B-6543863, as parameters of the theoretical analysis model, information on time, for example, a passing time of a vehicle passing through the bridge, a time point at which an axle enters the bridge, and the like are used. When analyzing time-series data of a physical quantity generated at an observation point of a structure, such as analyzing a model of a displacement when the vehicle enters the bridge, an entry time point of a formation moving object into the structure and an exit time point of the formation moving object from the structure may be acquired. The entry time point and the exit time point may be acquired by simple processing.

SUMMARY

A time point acquisition method includes: an acquisition step of acquiring time-series data including a physical quantity generated at a predetermined observation point in the structure as a response caused by a movement of a formation moving object formed with one or more moving objects on the structure; a removing step of removing a vibration component included in the time-series data; and a time point acquisition step of acquiring an entry time point at which the formation moving object enters the structure and an exit time point at which the formation moving object exits from the structure, based on the time-series data after the vibration component is removed.

A time point acquisition device includes: an acquisition unit configured to acquire time-series data including a physical quantity generated at a predetermined observation point in the structure as a response caused by a movement of a formation moving object formed with one or more moving objects on the structure; a removal unit configured to remove a vibration component included in the time-series data; and a time point acquisition unit configured to acquire an entry time point at which the formation moving object enters the structure and an exit time point at which the formation moving object exits from the structure, based on the time-series data after the vibration component is removed.

A time point acquisition system includes a time point acquisition device and a sensor. The time point acquisition device includes: an acquisition unit configured to acquire time-series data including a physical quantity that is generated at a predetermined observation point in a structure as a response caused by a movement of a formation moving object formed with one or more moving objects on the structure and that is measured via the sensor; a removal unit configured to remove a vibration component included in the time-series data; and a time point acquisition unit configured to acquire an entry time point at which the formation moving object enters the structure and an exit time point at which the formation moving object exits from the structure, based on the time-series data after the vibration component is removed.

A non-transitory computer-readable storage medium stores a program, the program causes a computer to execute: an acquisition step of acquiring time-series data including a physical quantity generated at a predetermined observation point in the structure as a response caused by a movement of a formation moving object formed with one or more moving objects on the structure; a removing step of removing a vibration component included in the time-series data; and a time point acquisition step of acquiring an entry time point at which the formation moving object enters the structure and an exit time point at which the formation moving object exits from the structure, based on the time-series data after the vibration component is removed.

DESCRIPTION OF EXEMPLARY EMBODIMENTS

Embodiments of the present disclosure will be described in the following order.

Figure 1:
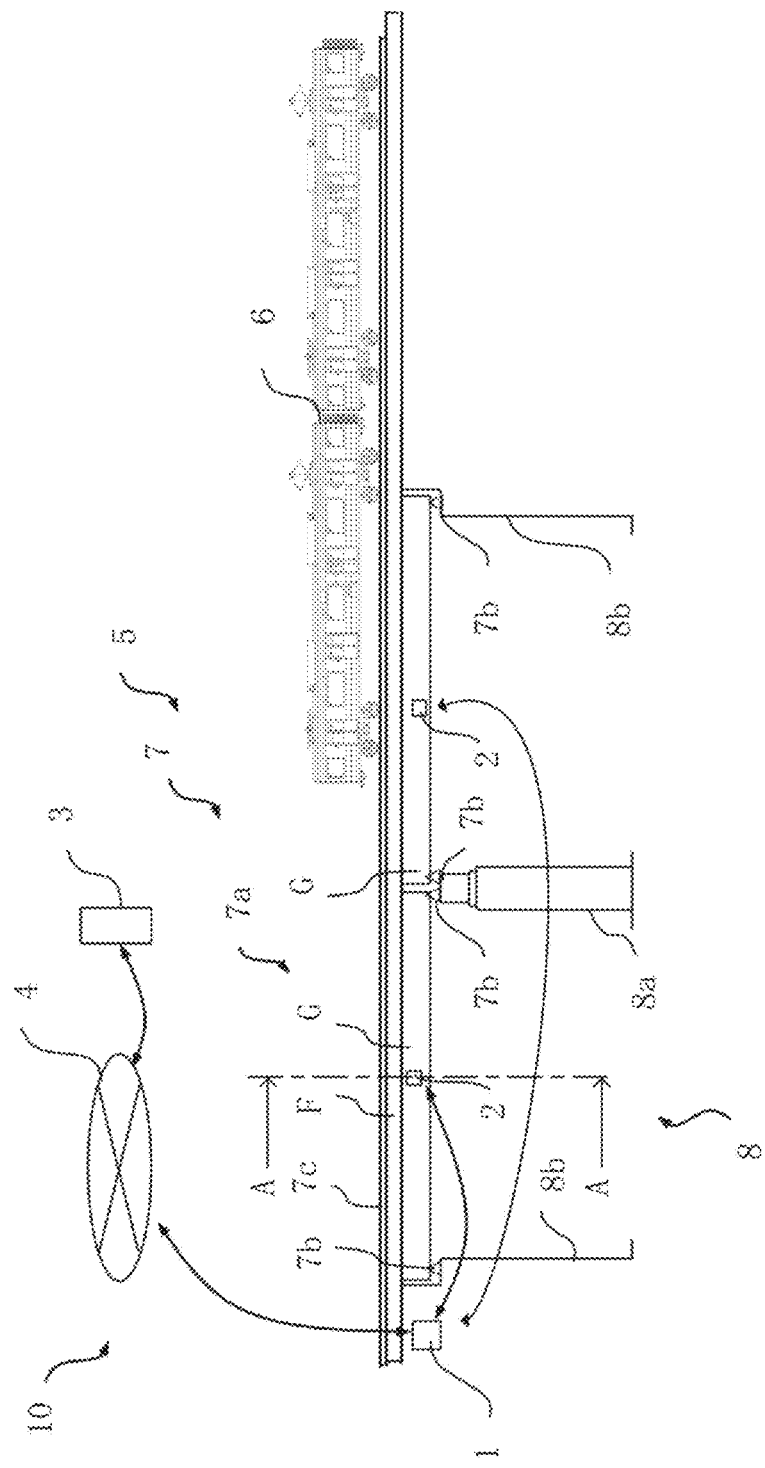
FIG. 1 is a block diagram showing a configuration of a time point acquisition system.

(1) Configuration of Time Point Acquisition System
(1-1) Outline of Time Point Acquisition System
(1-2) Deflection Model
(1-3) Verification Experiment
(1-4) Details of Elements
(2) Derivation Processing
(3-1) Second Embodiment
(3-2) Third Embodiment
(3-3) Fourth Embodiment
(4) Other Embodiments (1) Configuration of Time Point Acquisition System (1-1) Outline of Time Point Acquisition System FIG. 1 is a block diagram showing an example of a configuration of a time point acquisition system 10 according to an embodiment. The time point acquisition system 10 is a system that derives the number of railway vehicles included in a railway train 6 based on time-series data including a physical quantity at a predetermined observation point on a bridge 5 on which the railway train 6 formed with one or more railway vehicles moves. The railway train 6 is an example of a formation moving object. Each of the railway vehicles included in the railway train 6 is an example of a moving object. The bridge 5 is an example of a structure on which the moving object moves. Each railway vehicle of the railway train 6 moves on the bridge 5 via wheels provided on an axle. As shown in FIG. 1, the time point acquisition system 10 includes a measurement device 1, at least one sensor device 2 provided in a superstructure 7 of the bridge 5, and a server device 3.

The measurement device 1 calculates a displacement (a displacement in a vertical direction) of deflection of the superstructure 7 caused by traveling of the railway train 6 based on acceleration data which is a physical quantity output from each sensor device 2. The measurement device 1 is installed on, for example, a bridge abutment 8b. The measurement device 1 and the server device 3 can communicate with each other via, for example, a wireless network of a mobile phone and a communication network 4 such as the Internet. The measurement device 1 transmits information on the displacement of the superstructure 7 caused by the traveling of the railway train 6 to the server device 3. The server device 3 derives the number of railway vehicles formed in the railway train 6 based on the transmitted displacement data.

In the present embodiment, the bridge 5 is a railroad bridge, and is, for example, a steel bridge, a girder bridge, or an RC bridge. The RC is an abbreviation for reinforced-concrete. In the present embodiment, the bridge 5 is a structure to which Bridge Weigh In Motion (BWIM) is applicable. The BWIM is a technology in which a bridge is regarded as a "scale", deformation of the bridge is measured, and thereby a weight and the number of axles of a moving object passing through the bridge is measured. The bridge, which enables analysis of the weight of the moving object traveling on the bridge, based on a response such as deformation or strain of the bridge, is considered to be a structure to which BWIM is applicable. Therefore, the BWIM system, which applies a physical process between an action on the bridge and the response, enables the measurement of the weight of the moving object that travels on the bridge. The weight of the moving object is measured by measuring a correlation coefficient between the displacement and a load in advance, and using the correlation coefficient to derive the load of the moving object passing through from the measurement result of the displacement of the bridge when the moving object passes through.

Figure 2:
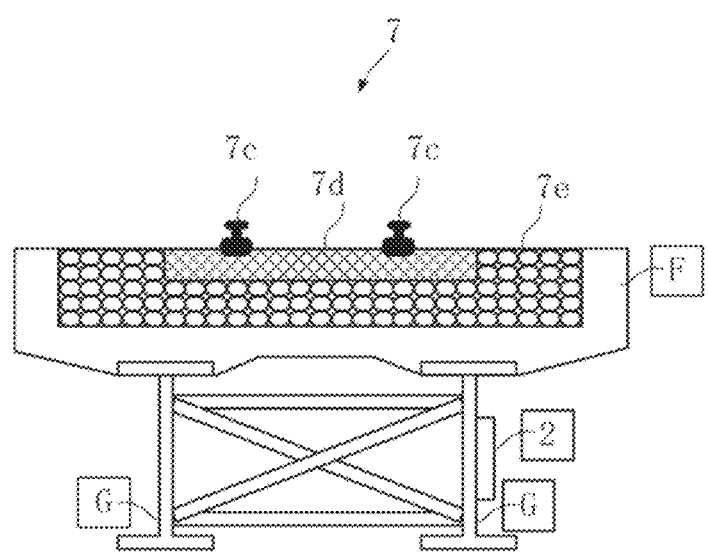
FIG. 2 is a diagram showing a cross section of a bridge.

The bridge 5 includes the superstructure 7 that is a portion where the moving object moves, and a substructure 8 that supports the superstructure 7. FIG. 2 is a cross-sectional view of the superstructure 7 taken along a line A-A of FIG. 1. As shown in FIGS. 1 and 2, the superstructure 7 includes a bridge floor 7a, a support 7b, rails 7c, ties 7d, and a ballast 7e, and the bridge floor 7a includes a floor plate F, a main girder G, a cross girder which is not shown. As shown in FIG. 1, the substructure 8 includes bridge piers 8a and the bridge abutments 8b. The superstructure 7 is a structure across the bridge abutment 8b and the bridge pier 8a adjacent to each other, two adjacent bridge abutments 8b, or two adjacent bridge piers 8a. Hereinafter, the bridge abutment 8b and the bridge pier 8a are collectively referred to as a support portion. In the present embodiment, a support that is a set of support portions and a portion of the bridge girder of the superstructure 7 across the set of support portions are collectively referred to as one bridge girder. That is, a simple beam-like structure in which both ends are supported by two support portions is defined as one bridge girder. Therefore, the bridge 5 shown in FIG. 1 includes two bridge girders. Hereinafter, each bridge girder included in the bridge 5 is referred to as a unit bridge girder.

The measurement device 1 and the sensor device 2 are coupled to each other, for example, in a wired or wireless manner, and communicate with one another via a communication network such as a controller area network (CAN). The sensor device 2 is used to measure a predetermined physical quantity used to derive a displacement (deflection) at an observation point set on the superstructure 7. In the present embodiment, the predetermined physical quantity is an acceleration. In the present embodiment, the sensor device 2 is installed at the observation point. The sensor device 2 includes an acceleration sensor such as a quartz acceleration sensor or a micro-electro-mechanical systems (MEMS) acceleration sensor. In the present embodiment, the sensor device 2 outputs the acceleration data for deriving the displacement of the superstructure 7 due to the movement of the railway train 6 which is a moving object at the observation point, but the sensor device 2 may naturally output a physical quantity other than the acceleration. The sensor device 2 may output data directly indicating the displacement or may output data indirectly indicating the displacement. In any case, it is sufficient that the time-series data of the displacement of the structure can be acquired based on the physical quantity output from the sensor device 2.

In the present embodiment, the sensor device 2 is installed at a central portion of the superstructure 7 in a longitudinal direction, specifically, at a central portion of the main girder G in the longitudinal direction. The sensor device 2 is not limited to being installed at the central portion of the superstructure 7 as long as the sensor device 2 can detect an acceleration for calculating the displacement of the superstructure 7. When the sensor device 2 is provided on the floor plate F of the superstructure 7, the sensor device 2 may be damaged due to traveling of the railway train 6, and the measurement accuracy may be influenced by local deformation of the bridge floor 7a, so that in the example of FIGS. 1 and 2, the sensor device 2 is provided at the main girder G of the superstructure 7. The floor plate F, the main girders G, and the like of the superstructure 7 are deflected in a vertical direction due to a load of the railway train 6 traveling on the superstructure 7. Each sensor device 2 measures an acceleration of the deflection of the floor plate F or the main girder G caused by the load of the railway train 6 traveling on the superstructure 7.

(1-2) Deflection Model

Here, a model of deflection of a bridge when a railway train moves on one unit bridge girder will be described. Here, the model is information such as an equation indicating a correspondence relationship between predetermined information and an estimation result. In the following, the number of railway vehicles (the number of railway vehicles) formed in the railway train moving on the bridge is defined as N. An entry time point, which is a time point at which the railway train enters the unit bridge girder, is defined as $t_i$. Here, the entry of the railway train into the unit bridge girder means that the wheels of a first axle of a railway vehicle $C_1$ (a first railway vehicle from the head of the railway train) have entered the unit bridge girder. In the following description, an exit time point, which is a time point at which the railway train exits from the unit bridge girder, is defined as $t_o$. Here, the exit of the railway train from the unit bridge girder means that the wheels of a rearmost axle of a railway vehicle CN (the rearmost railway vehicle of the railway train) have exited from the unit bridge girder. In addition, in the following, a period during which the railway train passes through the unit bridge girder (a period from the time point $t_i$ to the time point $t_o$) is defined as $t_s$. Hereinafter, N, $t_i$, $t_o$, and $t_s$ are collectively referred to as observation information.

Figure 3:
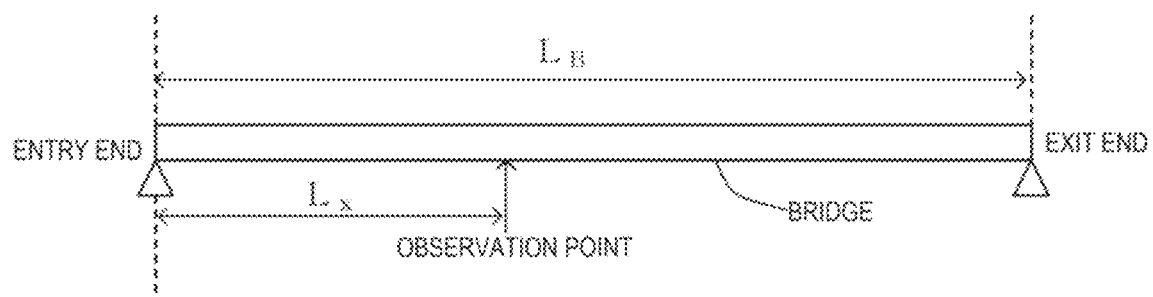
FIG. 3 is a diagram showing dimensions of a unit bridge girder.

In the following description, a bridge length, which is a length of the unit bridge girder in the traveling direction of the moving object in the traveling direction of the railway train, is defined as $L_B$. A distance from an end in a direction in which the railway train enters among ends of the unit bridge girder in the longitudinal direction to the observation point is defined as $L_x$. FIG. 3 shows the lengths $L_B$ and $L_x$. In the following description, the end in a direction in which the railway train enters among the ends of the unit bridge girder in the longitudinal direction is referred to as an entry end. In addition, in the following, an end in a direction in which the railway train exits among the ends of the unit bridge girder in the longitudinal direction is referred to as an exit end. A vehicle length, which is a length in the traveling direction of the mth railway vehicle from the head of the railway train, is defined as $L_C(m)$. Hereinafter, the lengths $L_C(1)$ to $L_C(N)$ are collectively referred to as a length $L_C$. The mth railway vehicle from the head of the railway train is defined as $C_m$. The number of axles in the railway vehicle $C_m$ is defined as $a_r(m)$. Hereinafter, $a_r(1)$ to $a_r(N)$ are collectively referred to as $a_r$. Hereinafter, the $a_r(m)$ axles in the railway vehicle $C_m$ are defined as a first axle, a second axle, a third axle, . . . , an $a_r(m)$th axle in order from the head of the railway vehicle $C_m$.

A distance from a front end of the railway vehicle $C_m$ in a traveling direction to the head axle (first axle) is defined as $L_a(a_w(m, 1))$. Here, $a_w(\alpha, \beta)$ indicates a βth axle from a head axle of the αth railway vehicle in the railway train. A distance between a (n−1)th axle and a nth axle in the railway vehicle $C_m$ is defined as $L_a(a_w(m, n))$, n being an integer of 2 or more. That is, for two or more β, $L_a(a_w(\alpha, \beta))$ indicates a distance between the βth axle and the β−1)th axle in a railway train $C_\alpha$. In addition, $L_a(a_w(\alpha, 1))$ indicates a distance between a first axle of the railway train $C_\alpha$ and the front end of the railway train $C_\alpha$ in the traveling direction. Hereinafter, $L_a(a_w(1, 1))$ to $L_a(a_w(N, a_r(N)))$ are collectively referred to as $L_a$. Each $L_a$ indicates a position of the corresponding axle in the corresponding railway vehicle. For example, $L_a(a_w(m, 1))$ indicates that the first axle is present behind the front end of the railway vehicle $C_m$ by a distance of $L_a(a_w(m, 1))$. $L_a(a_w(m, 2))$ indicates that the second axle is present behind the first axle of the railway vehicle $C_m$ by a distance of $L_a(a_w(m, 2))$.

Figure 4:
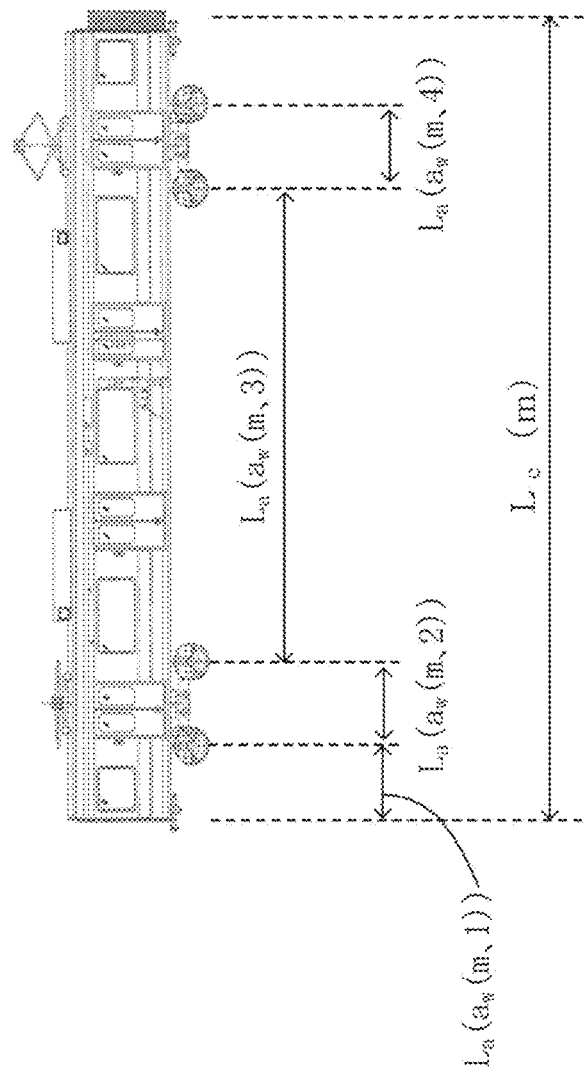
FIG. 4 is a diagram showing dimensions of a railway vehicle.

Here, a railway vehicle having a similar four-axle configuration is formed in the railway train. That is, $a_r(m)$ is 4, m being 1, 2, . . . , N. FIG. 4 shows the lengths $L_C(m)$, $L_a(a_w(m, 1))$, $L_a(a_w(m, 2))$, $L_a(a_w(m, 3))$, and $L_a(a_w(m, 4))$ in the railway vehicle $C_m$. Hereinafter, $L_B$, $L_x$, $L_C$, $a_r$, and $L_a$ are collectively referred to as environment information.

As shown in the following Equation (1), $t_s$ is obtained as a difference between $t_o$ and $t_i$.

$$t_s = t_o - t_i \tag{1}$$

The total number $T_{a_r}$ of wheels of the railway train is obtained by the following Equation (2).

$$T_{a_r} = \sum_{m=1}^{N} a_r(m) \tag{2}$$

A distance from the first axle of the railway vehicle $C_1$ at the head of the railway vehicle to the nth axle of the mth railway vehicle $C_m$ of the railway vehicle is represented as $D_{wa}(a_w(m, n))$. $D_{wa}(a_w(m, n))$ is obtained from the following Equation (3).

$$D_{wa}(a_w(m, n)) = \sum_{y=1}^{m} L_C(y) + \sum_{x=1}^{n} L_a(a_w(m, x)) - L_C(m) - L_a(a_w(1, 1)) \quad (3)$$

The distance from the first axle of the railway vehicle $C_1$ at the head of the railway vehicle to the last axle $a_r(N)$ of the rearmost railway vehicle $C_N$ is $D_{wa}(a_w(N, a_r(N)))$. By using $D_{wa}(a_w(N, a_r(N)))$, an average velocity $v_a$ of the railway train passing through the unit bridge girder is represented by the following Equation (4).

$$v_a = \frac{L_B}{t_s} + \frac{D_{wa}(a_w(N, a_r(N)))}{t_s} \quad (4)$$

From Equation (3) and Equation (4), the following Equation (5) is established.

$$v_a = \frac{L_B}{t_s} + \frac{1}{t_s}\left[\sum_{y=1}^{N} L_c(y) + \sum_{x=1}^{a_r(N)} L_a(a_w(N, x)) - L_c(N) - L_a(a_w(1, 1))\right] \quad (5)$$

Figure 5:
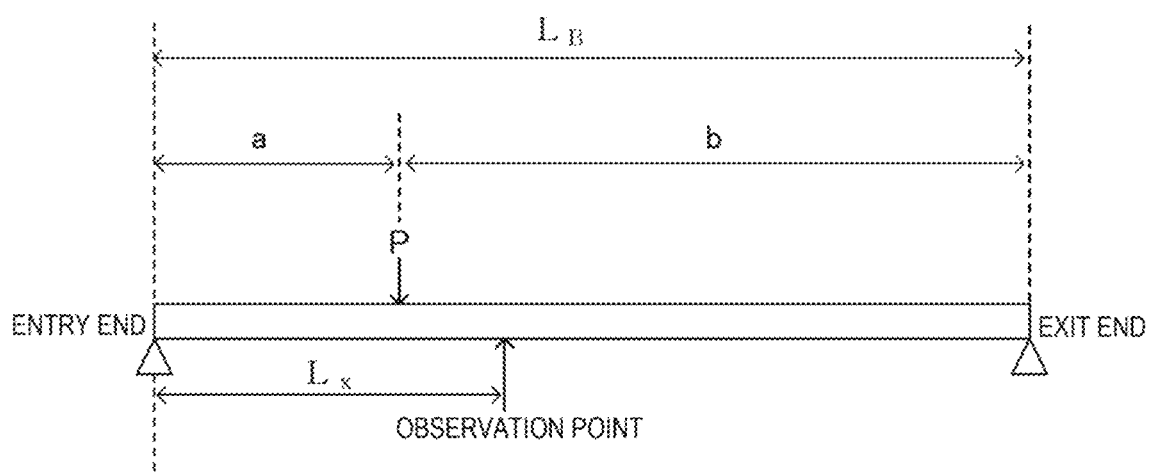
FIG. 5 is a diagram showing an outline of the unit bridge girder.

Next, deflection generated in the unit bridge girder when a load is applied to the unit bridge girder will be described. FIG. 5 is a schematic view of the unit bridge girder. FIG. 5 shows a situation in which a load P is applied to the bridge. Here, a distance between a position of the unit bridge girder to which the load P is applied and the entry end is represented by a. A distance between the position of the unit bridge girder to which the load P is applied and the exit end is represented by b. In this case, the bending moment at the position of the unit bridge girder to which the load P is applied is represented by the following Equation (6).

$$M = \frac{abP}{L_B} \quad (6)$$

Figure 6:
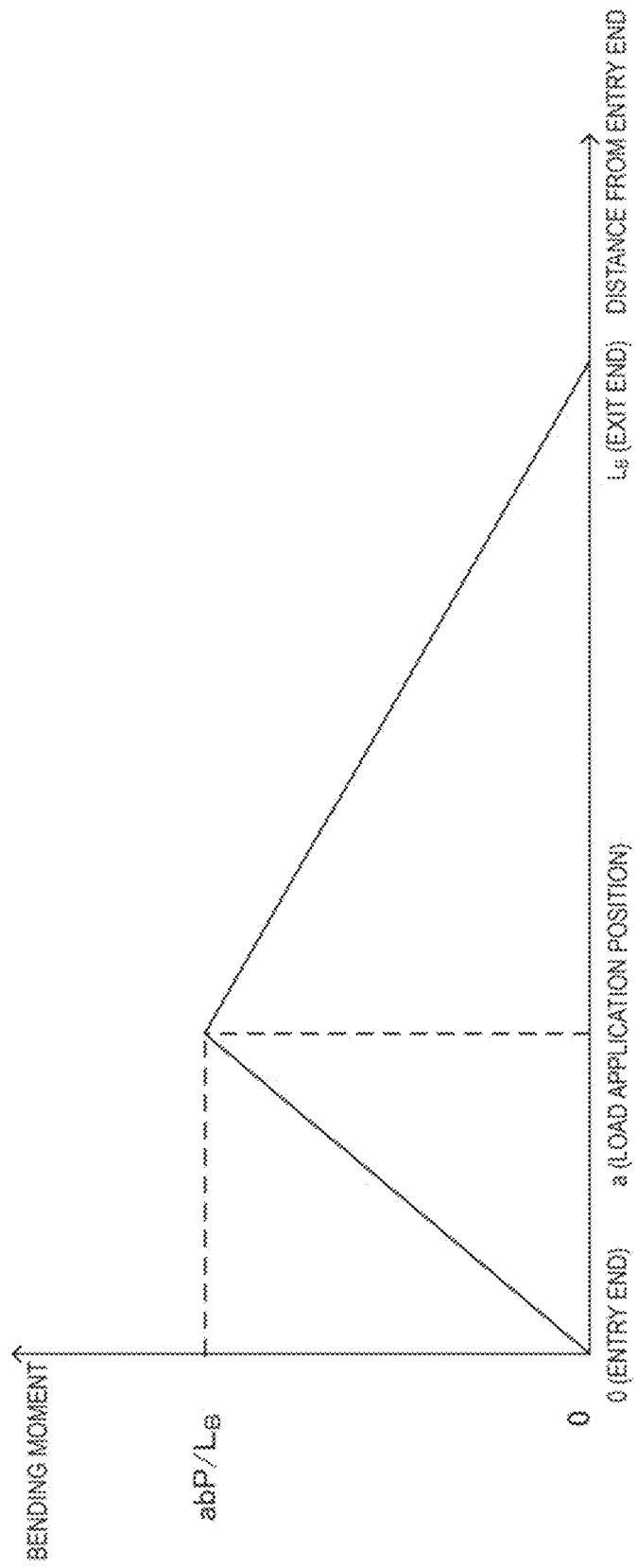
FIG. 6 is a diagram showing a bending moment at the unit bridge girder.

FIG. 6 shows the bending moment at each position of the unit bridge girder due to the load P. As shown in FIG. 6, the bending moment generated in the unit bridge girder due to the load P is 0 at the entry end, increases proportionally as the position approaches the position to which the load P is applied from the entry end, and becomes a value represented by Equation (6) at the position to which the load P is applied. The bending moment generated in the unit bridge girder due to the load P decreases proportionally as the position approaches the exit end from the position to which the load P is applied, and becomes 0 at the exit end. Therefore, the bending moment at an optional position X in the unit bridge girder is represented by the following Equation (7).

$$M = \frac{bP}{L_B}x - H_a P(x - a) \quad (7)$$

In Equation (7), x represents the distance from the entry end to the position X in the traveling direction of the railway train. Ha in Equation (7) is a value represented by the following Equation (8).

$$H_a = \begin{cases} x \leq a: & 0 \\ x > a: & 1 \end{cases} \quad (8)$$

Between the bending moment and a deflection w of the unit bridge girder at the optional position X, a relationship represented by the following Equation (9) is established.

$$-M = EI\frac{d\theta}{dx} = EI\frac{d^2w}{dx^2} \quad (9)$$

θ in Equation (9) is an angle formed by a horizontal line and the deflected unit bridge girder at the position X. From Equation (7) and Equation (9), the following Equation (10) is established.

$$\frac{d^2w}{dx^2} = -\frac{1}{EI}\left(\frac{bP}{L_B}x - H_a P(x - a)\right) \quad (10)$$

By integrating both sides of Equation (10) twice with x, the following Equation (11) representing the deflection w at the position X is obtained.

$$w = \frac{P}{6EIL_B}\{-bx^3 + H_a L_B(x - a)^3 + g1x + g2\} \quad (11)$$

In Equation (11), g1 and g2 are constant terms. Here, since the unit bridge girder is supported at the entry end and the exit end, no deflection is generated at the positions of the entry end and the exit end. That is, in Equation (11), when $x=0$ and $x=L_B$, both sides are 0. Therefore, g1 and g2 are represented by the following Equation (12) and Equation (13).

$$g1 = ab(a+2b) \quad (12)$$

$$g2 = 0 \quad (13)$$

From Equation (11), Equation (12), and Equation (13), the following Equation (14) representing the deflection w at the position X is obtained.

$$w = \frac{P}{6EIL_B}\{-bx^3 + H_a L_B(x - a)^3 + ab(a + 2b)x\} \quad (14)$$

When the load P is applied to a center of the unit bridge girder in the longitudinal direction, the maximum deflection among the deflection generated in the unit bridge girder due to the application of the load P is generated at the center of the unit bridge girder in the longitudinal direction. When this maximum deflection is $w_{0.51}$, an equation representing $w_{0.51}$ is obtained. When the load P is applied to the center of the unit bridge girder in the longitudinal direction, $a=b=0.5L_B$. Since the position X of a target for which the deflection is to be obtained is the center of the unit bridge girder in the longitudinal direction, $x=0.5L_B$. In this case, since $x \leq a$, $H_a = 0$ is obtained from Equation (8). By substituting $x=0.5L_B$, $a=b=0.5L_B$, and $H_a=0$ into Equation (14), the following Equation (15) representing the deflection $w_{0.5l}$ is obtained.

$$w_{0.5l} = \frac{P}{48EI}L_B^3 \tag{15}$$

The deflection at an optional position in the unit bridge girder represented by Equation (14) is normalized using $w_{0.5l}$.

When the position of the load P exists on the entry end side with respect to the position X, that is, when $x>a$, $H_a=1$ is obtained from Equation (8), and Equation (14) is represented as Equation (16) below.

$$w = \frac{P}{6EIL_B}\{-bx^3 + L_B(x-a)^3 + ab(a+2b)x\} \tag{16}$$

$a=L_B r$. Here, r is a real number from 0 to 1. Since $b=L_B-a$, b is represented as $b=L_B(1-r)$. When $a=L_B r$ and $b=L_B(1-r)$ are substituted into Equation (16) and the deflection is normalized by dividing by $w_{0.5l}$, the following Equation (17) representing normalized deflection $w_{std}$ at the position X when $x>a$ is obtained.

$$w_{std} = \frac{8}{L_B}\left\{xr^3 + \left(\frac{x^3}{L_B^2} + 2x\right)r\right\} - \frac{8}{L_B}\left\{L_B r^3 + \frac{3x^2}{L_B}r\right\} \tag{17}$$

Similarly, when the position of the load P exists on the exit end side with respect to the position X, that is, when $x \leq a$, $H_a=0$ is obtained from Equation (8), and Equation (14) is represented as the following Equation (18).

$$w = \frac{P}{6EIL_B}\{-bx^3 + ab(a+2b)x\} \tag{18}$$

$a=L_B r$. Here, r is a real number from 0 to 1. Since $b=L_B-a$, b is represented as $b=L_B(1-r)$. When $a=L_B r$ and $b=L_B(1-r)$ are substituted into Equation (18) and the deflection is normalized by dividing by $w_{0.5l}$, the following Equation (19) representing the normalized deflection $w_{std}$ at the position X when $x \leq a$ is obtained.

$$w_{std} = \frac{8}{L_B}\left\{xr^3 + \left(\frac{x^3}{L_B^2} + 2x\right)r\right\} - \frac{8}{L_B}\left\{3xr^3 + \frac{x^3}{L_B^2}\right\} \tag{19}$$

By substituting $L_x$ for x in Equation (17) and Equation (19), the normalized deflection $w_{std}$ at the deflection observation point is represented as the following Equation (20) as a function of r.

$$w_{std}(r) = \frac{8}{L_B}\left\{L_x r^3 + \left(\frac{L_x^3}{L_B^2} + 2L_x\right)r\right\} - R(r) \tag{20}$$

The function R(r) in Equation (20) is a function represented by the following Equation (21).

$$R(r) = \begin{cases} L_x > L_g r: & L_g r^3 + \frac{3L_x^2}{L_B}r \\ L_x \leq L_g r: & 3L_x r^2 + \frac{L_x^3}{L_B^2} \end{cases} \tag{21}$$

Here, using Equation (20) and Equation (21), a function indicating a temporal change in deflection generated at an observation point due to a load applied to the bridge via a wheel of any one axle $a_w(m, n)$ is obtained. First, a period required for the wheel of one axle of the railway train to reach the observation point from the entry end is defined as $t_{xn}$. $t_{xn}$ is obtained from $L_x$ and $v_a$ by the following Equation (22).

$$t_{xn} = \frac{L_x}{v_a} \tag{22}$$

A period during which one wheel of the railway train crosses the unit bridge girder, that is, a period from the entry end to the exit end is defined by $t_{ln}$. $t_{ln}$ is obtained from $L_B$ and $v_a$ by the following Equation (23).

$$t_{in} = \frac{L_B}{v_a} \tag{23}$$

A time point at which the wheel of the nth axle $a_w(m, n)$ of the mth railway vehicle of the railway train reaches the entry end is defined as $t_o(m, n)$. $t_o(m, n)$ is obtained from $t_i$, $v_a$, and $D_{wa}(a_w(m, n))$ by the following Equation (24).

$$t_0(m, n) = t_i + \frac{D_{wa}(a_w(m, n))}{v_a} \tag{24}$$

From Equation (22), $L_x$ is represented as the following Equation (25).

$$L_x = v_a t_{xn} \tag{25}$$

From Equation (23), $L_B$ is represented as the following Equation (26).

$$L_s = N_a t_{ln} \tag{26}$$

The position of the axle $a_w(m, n)$ is a load position. Therefore, the position of the axle $a_w(m, n)$ is a position at a distance of $a=L_B r$ in the direction from the entry end to the exit end. When a variable indicating the time point is t, a distance from the entry end of $a_w(m, n)$ at the time point t is equal to a distance traveled by the railway vehicle from the time point $t_o(m, n)$ to the time point t. Therefore, the following Equation (27) is established.

$$L_B r = v_a(t - t_o(m,n)) \tag{27}$$

From Equation (27), r is represented as in the following Equation (28).

$$r = \frac{v_a(t - t_0(m, m))}{L_B} = \frac{v_a(t - t_0(m, n))}{v_a t_{in}} = \frac{(t - t_0(m, n))}{t_{in}} \tag{28}$$

By replacing $L_x$, $L_B$, and r in Equation (20) and Equation (21) using Equation (25), Equation (26), and Equation (28), a function $w_{std}(a_w(m, n), t)$ in the following Equation (29) is obtained as a model indicating a temporal change in deflection generated at the observation point due to the load applied to the unit bridge girder via the wheel of the axle $a_w(m, n)$. A function $R(t)$ in Equation (29) is a function represented by the following Equation (30).

$$w_{std}(a_w(m, n), t) = \begin{cases} t < t_0(m, n): & 0 \\ t_0(m, n) \leq t \leq t_0(m, n) + t_{in}: & \dfrac{8}{t_{in}} \left\{ \dfrac{t_{xn}\left(\dfrac{t - t_0(m, n)}{t_{in}}\right)^3 +}{\left(\dfrac{t_{xn}^3}{t_{in}^2} + 2t_{xn}\right)\left(\dfrac{t - t_0(m, n)}{t_{in}}\right)} - R(t) \right\} \\ t_0(m, n) + t_{in} < t: & 0 \end{cases} \quad (29)$$

$$R(t) = \begin{cases} t < t_0(m, n): 0 \\ \begin{array}{l} t_0(m, n) \leq t \leq t_0(m, n) + \\ t_{in} \cap t_{xn} > t - t_0(m, n): \end{array} & t_{in}\left(\dfrac{t - t_0(m, n)}{t_{in}}\right)^3 + \dfrac{3t_{xn}^2}{t_{in}}\left(\dfrac{t - t_0(m, n)}{t_{in}}\right) \\ \begin{array}{l} t_0(m, n) \leq t \leq t_0(m, n) + \\ t_{in} \cap t_{xn} \leq t - t_0(m, n): \end{array} & 3t_{xn}\left(\dfrac{t - t_0(m, n)}{t_{in}}\right)^2 + \dfrac{t_{xn}^3}{t_{in}^2} \\ t_0(m, n) + t_{in} < t: 0 \end{cases} \quad (30)$$

When the observation information and the environment information ($t_i$, $t_o$, $N$, $L_B$, $L_x$, $L_C(1)$ to $L_C(N)$, $a_r(1)$ to $a_r(N)$, and $L_a(a_w(1, 1))$ to $L_a(a_w(N, a_r(N)))$) are known, $w_{std}(a_w(m, n), t)$ is obtained using the information. For example, $t_s$ is obtained from $t_i$ and $t_o$ using Equation (1). From $t_s$, $N$, $a_r$, $L_a$, and $L_C$, $v_a$ is obtained using Equation (5). From $v_a$, $L_B$, and $L_x$, $t_{xn}$ and $t_{in}$ are obtained using Equation (22) and Equation (23). From $L_a$, $L_C$, and $t_i$, $t_o(m, n)$ is obtained using Equation (3) and Equation (24). Then, by substituting the obtained $t_{xn}$, $t_{in}$, and $t_o(m, n)$ into the Equation (29) and Equation (30), the function $w_{std}(a_w(m, n), t)$ of t is obtained.

Figure 7:
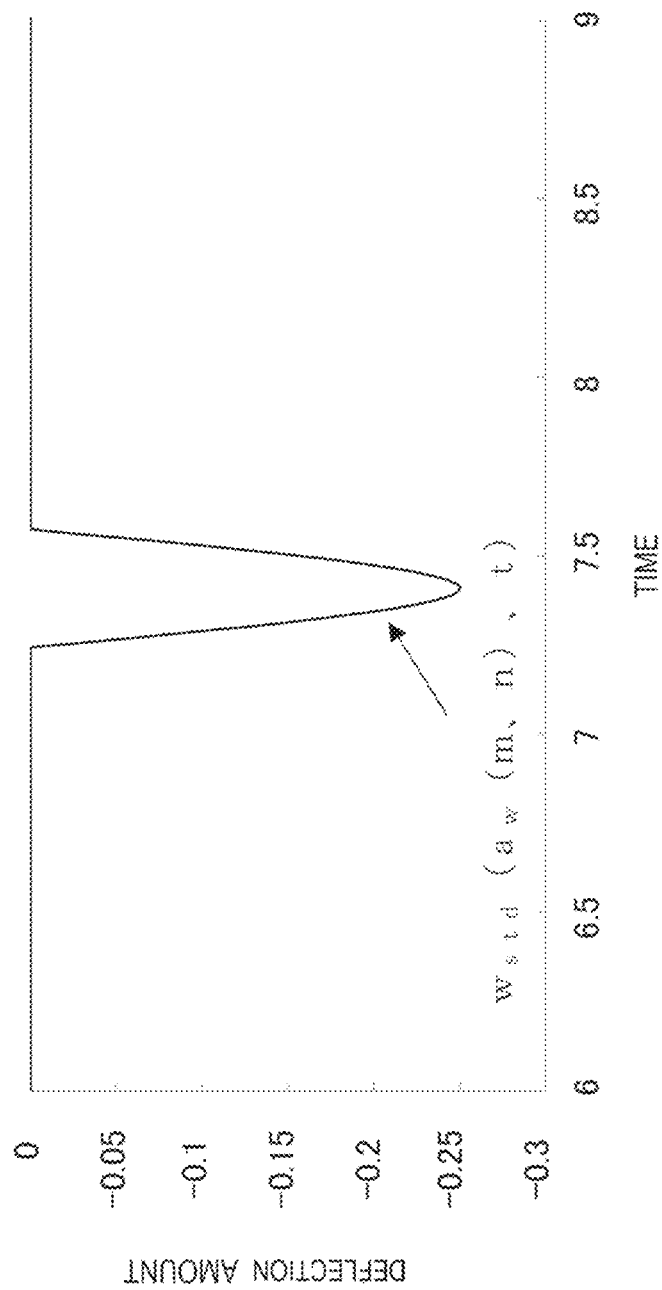
FIG. 7 is a diagram showing an outline of deflection of the unit bridge girder caused by a wheel.

An example of a change in the deflection amount at the observation point indicated by $w_{std}(a_w(m, n), t)$ is shown in FIG. 7. In a graph of FIG. 7, a horizontal axis represents time, and a vertical axis represents the deflection amount. In accordance with the movement of one railway vehicle $C_m$, a set of wheels for each of the $a_r(m)$ axles moves on the unit bridge girder. Therefore, a function $C_{std}(m, t)$ serving as a model indicating a temporal change in the deflection amount generated at the observation point due to the movement of one railway vehicle $C_m$ is obtained as the sum of $w_{std}(a_w(m, n), t)$ for the respective axles as in the following Equation (31).

$$C_{std}(m, t) = \sum_{n=1}^{a_r(m)} w_{std}(a_w(m, n), t) \quad (31)$$

Figure 8:
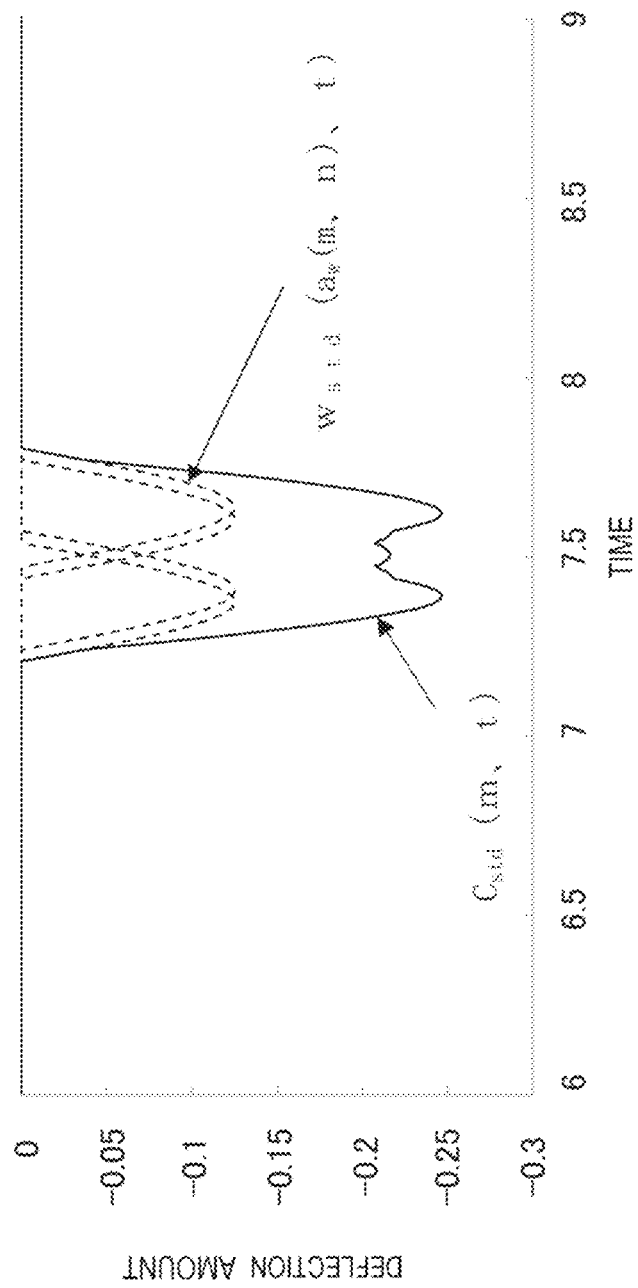
FIG. 8 is a diagram showing an outline of deflection of the unit bridge girder caused by a railway vehicle.

FIG. 8 shows how the deflection amount changes at the observation point indicated by the function $C_{std}(m, t)$ when $a_r(m)$ is 4, that is, when the railway vehicle $C_m$ has a four-axle configuration. In a graph of FIG. 8, a horizontal axis represents time, and a vertical axis represents the deflection amount. A solid line in the graph of FIG. 8 indicates $C_{std}(m, t)$, and each dotted line in the graph indicates $w_{std}(a_w(m, n), t)$ for each axle.

In accordance with the movement of the railway train, the N railway vehicles move on the unit bridge girder. Therefore, a function $T_{std}(t)$ serving as a model indicating a temporal change in the deflection amount generated at the observation point due to movement of one railway train is obtained as the sum of $C_{std}(m, t)$ for the respective railway vehicles as in the following Equation (32).

$$T_{std}(t) = \sum_{m=1}^{N} C_{std}(m, t) \quad (32)$$

Figure 9:
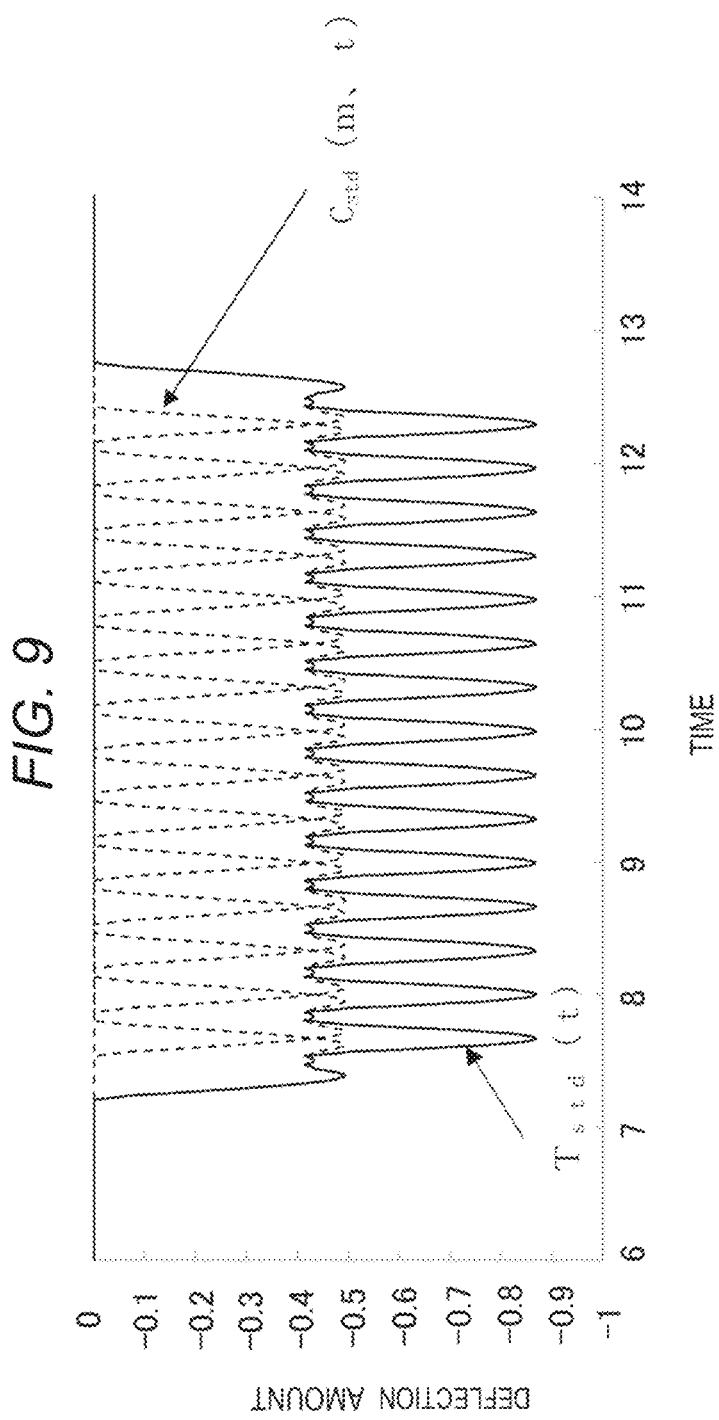
FIG. 9 is a diagram showing an outline of deflection of the unit bridge girder caused by a railway train.

FIG. 9 shows how the deflection amount changes at the observation point indicated by the function $T_{std}(t)$ when N is 16, that is, when 16 railway vehicles are formed in the railway train. In a graph of FIG. 9, a horizontal axis represents time, and a vertical axis represents the deflection amount. A solid line in the graph of FIG. 9 indicates $T_{std}(t)$, and each dotted line in the graph indicates $C_{std}(m, t)$ for each railway vehicle. As shown in the graph of FIG. 9, the waveform is obtained by adding together the deflection of each passing railway vehicle, and it can be seen that vibration occurs in a cycle in which continuous railway vehicles pass through the unit bridge girder. The deflection model of the unit bridge girder is described as above.

(1-3) Verification Experiment

The inventors obtained the deflection amount $T_{std}(t)$ under conditions that the observation information and the environment information have the following values. That is, $N=4$, $t_i=7.21$ [sec], $t_o=8.777$ [sec], $t_s=1.567$ [sec], $L_B=25$ [m], $L_x=12.5$ [m], $L_C=25$ [m], $a_r=4$, $L_a(a_w(m, 1))=2.5$ [m] for each of m=1 to N, $L_a(a_w(m, 2))=2.5$ [m] for each of m=1 to N, $L_a(a_w(m, 3))=15$ [m] for each of m=1 to N, and $L_a(a_w(m, 4))=2.5$ [m] for each of m=1 to N.

Figure 10:
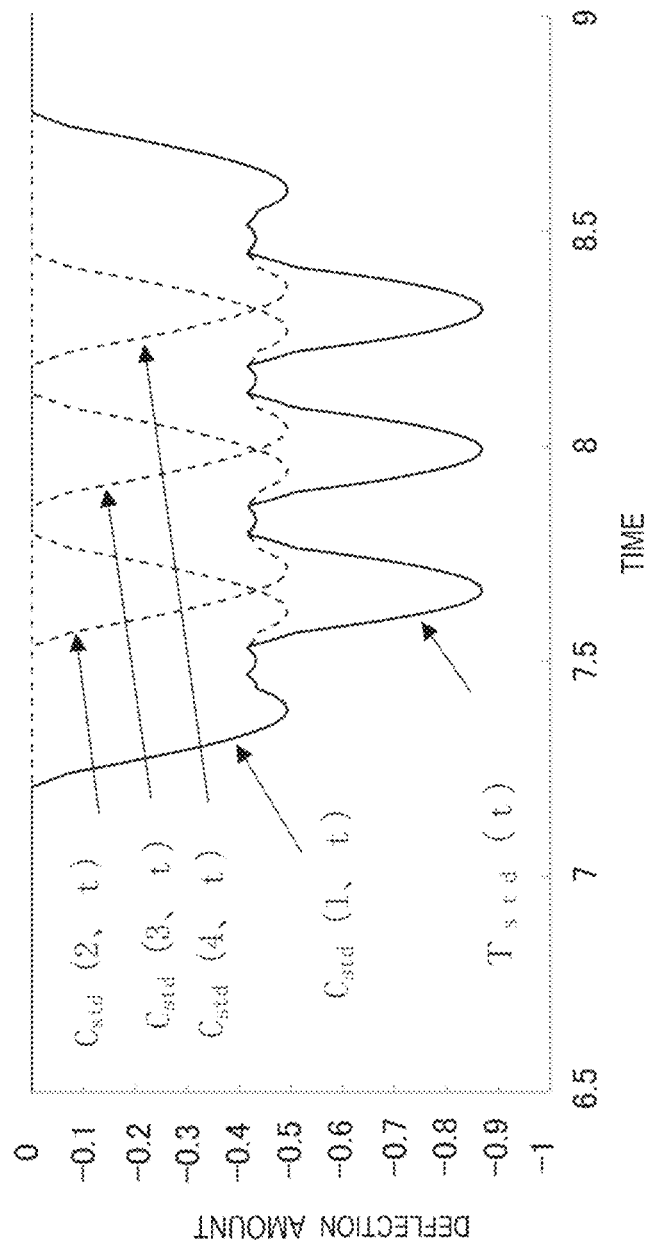
FIG. 10 is a diagram showing deflection of the unit bridge girder caused by each railway vehicle.
Figure 11:
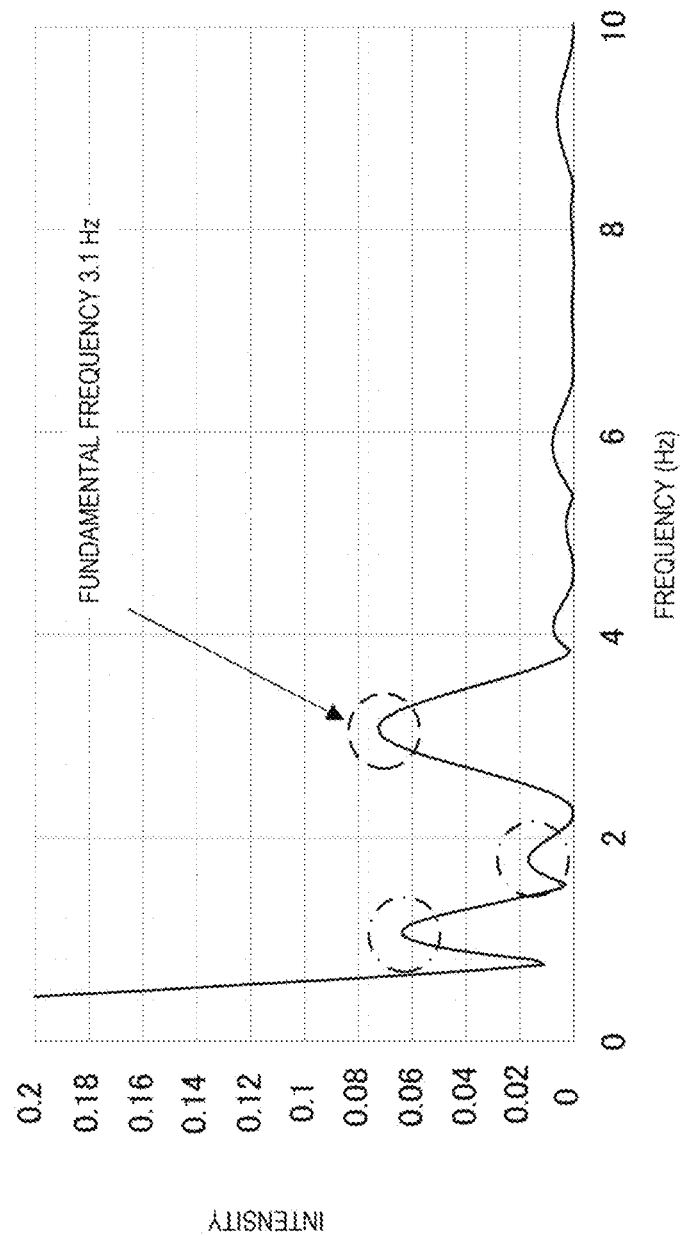
FIG. 11 is a diagram showing an FFT result of time-series data.

The deflection amount $T_{std}(t)$ at this time is shown in FIG. 10. In a graph of FIG. 10, a horizontal axis represents time, and a vertical axis represents the deflection amount. The inventors also obtained an intensity of each frequency component included in $T_{std}(t)$ by performing fast Fourier transform (FFT) on the obtained $T_{std}(t)$. A result of the FFT for $T_{std}(t)$ is shown in FIG. 11. In a graph of FIG. 11, a horizontal axis represents the frequency, and a vertical axis represents the intensity of the corresponding frequency component. Then, the inventors obtained a fundamental frequency $F_f$ of $T_{std}(t)$ from the result of the FFT of $T_{std}(t)$ as the frequency of the vibration occurring in the bridge in accordance with the movement of the continuous railway vehicles. Here, the fundamental frequency is a frequency of a component having the lowest frequency included in the signal. Specifically, the inventors specified a peak corresponding to the lowest frequency from the result of the FFT of $T_{std}(t)$ except for a side lobe generated due to an influence of a window function used in the FFT, and obtained the specified peak as the fundamental frequency. In the example of FIG. 11, as indicated by portions surrounded by one-dot chain lines, two peaks of the side lobes generated due to the influence of the window function used in the FFT are observed in a range of less than 2 Hz. The inventors specified a peak in a portion surrounded by a dotted line as a peak having the lowest frequency among the peaks excluding these peaks, and obtained a frequency corresponding to the specified peak as the fundamental frequency $F_f$. The inventors obtained a fundamental frequency of 3.1 Hz from the graph of FIG. 11. The inventors obtained a wave number ν of the fundamental frequency $F_f$ included in a passing period is by using the following Equation (33).

$$\nu = t_s F_f \tag{33}$$

In this case, ν=1.567×3.1=4.8577. Here, the number N of railway vehicles of the moving railway train is 4. The inventors found a feature that the wave number ν of the fundamental frequency $F_f$ included in the passing period $t_s$ is a value higher than N by about one. Therefore, the inventors found that the number N of railway vehicles included in a railway train can be obtained by using the following Equation (34), assuming that the number N of railway vehicles included in the railway train can be obtained as a value obtained by rounding, to an integer, a value obtained by subtracting one from the wave number ν of the fundamental frequency $F_f$ included in the passing period $t_s$. A round function is a function that returns a value obtained by rounding off an argument. The method of rounding the value to an integer is not limited to rounding off, and other methods such as rounding down and rounding up may be used in accordance with the characteristics of a unit bridge girder to be observed.

$$N = \text{round}(\nu - 1) \tag{34}$$

The number N of railway vehicles may be acquired by various methods other than Equation (34). For example, if the high-pass filter processing is performed on the deflection amount $T_{std}(t)$ to leave the vibration of the unit bridge girder caused by the movement of the railway vehicles, the number N of railway vehicles can be acquired based on the number of peaks. The deflection amount after the high-pass filter processing is defined as $T_{std\_hp}(t)$, and is superimposed on $T_{std}(t)$ and shown in FIG. 12. In a graph of FIG. 12, a horizontal axis represents time, and a vertical axis represents the deflection amount. A solid line in the graph of FIG. 12 indicates $T_{std\_hp}(t)$, and a dotted line in the graph indicates $T_{std}(t)$.

Figure 12:
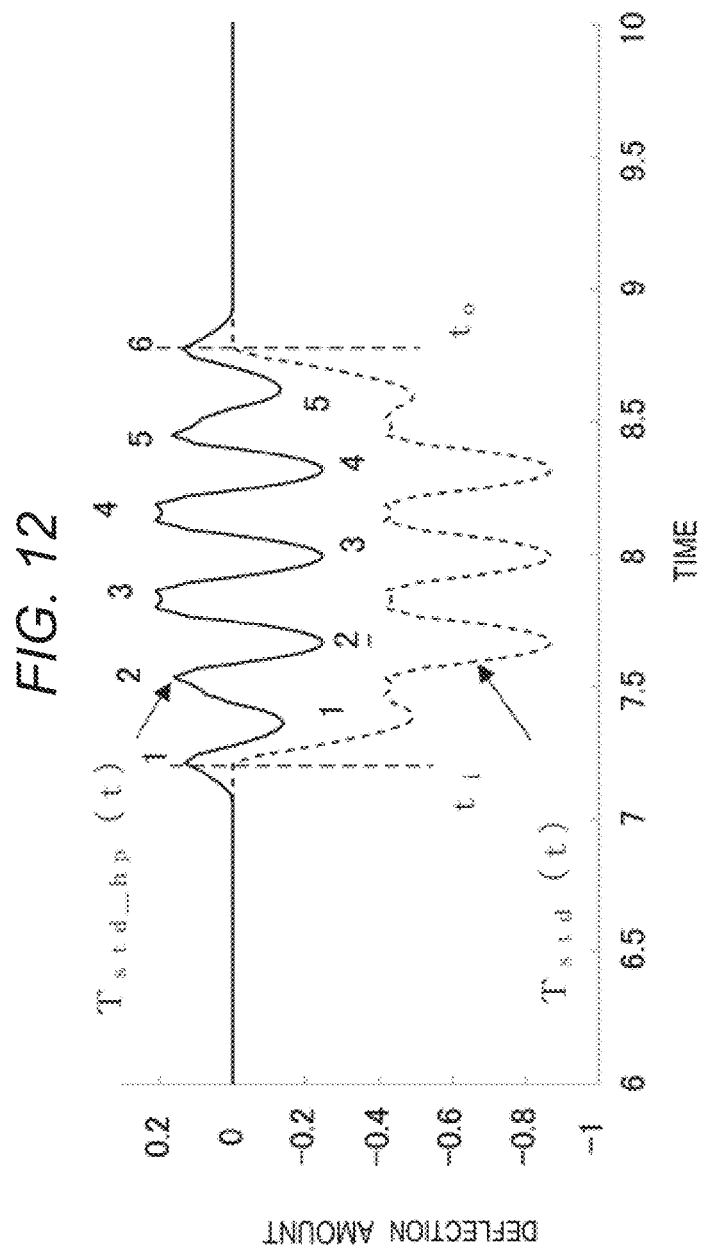
FIG. 12 is a diagram showing a deflection amount after high-pass filter processing.

As shown in FIG. 12, since the number (6) of upwardly convex peaks and the number (5) of downwardly convex peaks are different from each other, the number N of railway vehicles can be acquired by increasing or decreasing a predetermined number with respect to each peak. For example, it is possible to adopt a configuration in which 4 obtained by subtracting 2 from the number of upwardly convex peaks is regarded as the number of railway vehicles, a configuration in which 4 obtained by subtracting 1 from the number of downwardly convex peaks is regarded as the number of railway vehicles, or the like. Of course, the number N of railway vehicles may be acquired by other various methods, and for example, the number N of railway vehicles may be acquired based on a relationship between the passing period $t_s$ and time required for each railway vehicle to pass.

(1-4) Details of Element

Here, each of the measurement device 1, the sensor device 2, and the server device 3 of the time point acquisition system 10 will be described in detail with reference to FIG. 13. In the present embodiment, the environmental information for each of the railway train 6 and the unit bridge girders is known. That is, a bridge length $L_B$ of the unit bridge girder, a distance $L_x$ from the entry end of the unit bridge girder to the observation point, a vehicle length $L_C$ of each railway vehicle of the railway train 6, the number $a_r$ of axles of each railway vehicle of the railway train 6, and $L_a$ of each railway vehicle of the railway train 6 are known. Specifically, $L_B$=25 [m], $L_x$=12.5m, $L_c(1)$ to $L_c(N)$=25 [m], $a_r(1)$ to $a_r(N)$=4, $L_a(a_w(1, 1))$ to $L_a(a_w(N, 1))$=2.5 [m], $L_a(a_w(1, 2))$ to $L_a(a_w(N, 2))$=2.5 [m], $L_a(a_w(1, 3))$ to $L_a(a_w(N, 3))$=15 [m], and $L_a(a_w(1, 4))$ to $L_a(a_w(N, 4))$=2.5 [m].

In the present embodiment, the time point acquisition system 10 derives the observation information (the number N of railway vehicles formed in the railway train 6, the entry time point $t_i$ at which the railway train 6 enters the unit bridge girder, the exit time point $t_o$ at which the railway train 6 exits the unit bridge girder, and the passing period $t_s$ during which the railway train 6 passes through the unit bridge girder) based on data measured by the measurement device 1. The number N of railway vehicles formed in the railway train 6 is 16, but the observation is performed assuming that the number N is unknown.

The measurement device 1 measures the deflection at the observation point via the sensor device 2. In the present embodiment, the measurement device 1 is installed on the bridge abutment 8b, but may be installed at another position. The measurement device 1 includes a control unit 100, a storage unit 110, and a communication unit 120. The control unit 100 includes a processor such as a CPU (Central Processing Unit), a ROM (Read Only Memory), a RAM (Random Access Memory), and the like. The control unit 100 implements each function of the measurement device 1 by loading various programs recorded in the ROM or the like in the RAM and executing the programs via the CPU. The storage unit 110 stores various programs, measured deflection data, and the like. The communication unit 120 includes a circuit used for wired or wireless communication with an external device.

The sensor device 2 detects the acceleration as the predetermined physical quantity at the observation point. The sensor device 2 includes a control unit 200, an acceleration sensor 210, a storage unit 220, and a communication unit 230. The control unit 200 includes a processor such as a CPU, a ROM, a RAM, and the like. The control unit 200 implements each function of the sensor device 2 by loading various programs recorded in the ROM or the like in the RAM and executing the programs via the CPU.

The acceleration sensor 210 is an acceleration sensor such as a quartz acceleration sensor or a MEMS acceleration sensor capable of detecting an acceleration generated in each axial direction of three axes orthogonal to one another. In the present embodiment, the acceleration sensor 210 is disposed such that one axis is parallel to the vertical direction in order to more accurately detect the acceleration in the vertical direction. However, an installation location of the sensor device 2 in the superstructure 7 may be inclined. Even when one of the three detection axes of the acceleration sensor 210 is not installed in alignment with the vertical direction, the measurement device 1 combines the accelerations of the three axes and detects the acceleration in the vertical direction.

The control unit 200 of the sensor device 2 detects an acceleration in a cycle in the vertical direction at the observation point on the bridge 5 via the acceleration sensor 210, and transmits the detected acceleration data to the measurement device 1. The control unit 100 of the measurement device 1 measures the deflection of the bridge 5 in the vertical direction at the observation point at an acceleration detection time point based on the acceleration data transmitted from the sensor device 2. In the present embodiment, the control unit 100 obtains the deflection of the bridge 5 in the vertical direction at the observation point by integrating the acceleration indicated by the data transmitted from the sensor device 2 twice with respect to time. Then, the control unit 100 transmits the measured deflection data to the server device 3. In the present embodiment, the sensor device 2 detects the acceleration in a predetermined cycle ΔT. Therefore, the measurement device 1 measures the time-series data (data indicating a time change in the displacement of the structure) of the deflection in the ΔT cycle.

The server device 3 derives the number of railway vehicles included in the railway train 6 based on the deflection of the observation point measured by the measurement device 1. The server device 3 includes a control unit 300, a storage unit 310, and a communication unit 320. The control unit 300 includes a processor such as a CPU, a ROM, a RAM, and the like. The control unit 300 implements functions of a data acquisition unit 301, a removal unit 302, a time point acquisition unit 303, and a number acquisition unit 304 by loading various programs recorded in the ROM or the like into the RAM and executing the programs via the CPU. The storage unit 310 stores various programs, the detected deflection data, and the like. The communication unit 320 includes a circuit used for wired or wireless communication with an external device.

The data acquisition unit 301 has a function of acquiring the time-series data of the deflection generated at the observation point as a response caused by the movement of the railway train 6 on each unit bridge girder in the bridge 5. With the function of the data acquisition unit 301, the control unit 300 acquires the time-series data of the deflection generated at the observation point from the measurement device 1. Hereinafter, the time-series data of the deflection acquired by the function of the data acquisition unit 301 is defined as u(k). Here, k is a variable indicating what number of observations when the deflection amount is observed in a cycle at the observation point. FIG. shows an example of u(k). In a graph of FIG. 14, a horizontal axis represents time, and a vertical axis represents the deflection amount. Here, time point t=kΔT. That is, since the acceleration is detected at ΔT of time decomposition, the time-series data of the deflection is data with respect to discrete time. Therefore, in the following, the time-series data u(k) is expressed as a function of a variable k corresponding to time.

The removal unit 302 has a function of removing a vibration component included in the time-series data u(k). With the function of the removal unit 302, the control unit 300 performs the low-pass filter processing on the time-series data u(k) to remove the vibration component. The low-pass filter processing may be various processing, and in the present embodiment, the low-pass filter processing is performed by calculating a moving average of the time-series data u(k). In the present embodiment, the fundamental frequency $F_f$ is used to determine a moving average interval.

Therefore, with the function of the removal unit 302, the control unit 300 performs the FFT on u(k). FIG. 15 shows a result of performing the FFT on u(k) shown in FIG. 14. In a graph of FIG. 15, a horizontal axis represents the frequency, and a vertical axis represents the intensity of the component of the corresponding frequency. Then, the control unit 300 detects a peak from the FFT result. The control unit 300 specifies, among the detected peaks, a peak corresponding to a minimum frequency excluding a peak of a side lobe generated due to an influence of a window function used in the FFT. The control unit 300 derives the frequency corresponding to the specified peak as the fundamental frequency $F_f$ of u(k). In an example of FIG. 15, the derived fundamental frequency $F_f$ is 3.01 Hz.

Then, the control unit 300 applies low-pass filter processing for attenuating a component of a frequency equal to or higher than the fundamental frequency $F_f$ to u(k) as follows. First, the control unit 300 derives a basic cycle $T_f$ by deriving the reciprocal of $F_f$ based on the acquired fundamental frequency $F_f$ based on the following Equation (35).

$$T_f = \frac{1}{F_f} \tag{35}$$

Further, the control unit 300 derives the interval $k_{mf}$ using Equation (36) based on the derived $T_f$ and ΔT which is a predetermined cycle.

$$k_{mf} = 2\left\lfloor \frac{T_f}{2\Delta T} \right\rfloor + 1 \tag{36}$$

Further, the control unit 300 applies a low-pass filter to u(k) by acquiring a moving average in the interval $k_{mf}$ derived for each value of u(k) based on Equation (37). The low-pass filter may be an FIR filter or the like having a condition of attenuating a component of a frequency equal to or higher than the fundamental frequency $F_f$.

$$u_{lp}(k) = \frac{1}{k_{mf}} \sum_{n=k-\frac{k_{mf}-1}{2}}^{k+\frac{k_{mf}-1}{2}} u(n) \tag{37}$$

Here, u(k) subjected to the low-pass filter processing is referred to as $u_{lp}(k)$. As described above, in the present embodiment, the moving average $u_{lp}(k)$ of the time-series data u(k) of the variable k is an average of the time-series data u(k) of an interval having the variable k as a center and the basic cycle $T_f$ as a width. Therefore, according to the low-pass filter processing of the present embodiment, a change in the cycle equal to or less than the basic cycle $T_f$ is averaged, and a change in a cycle greater than the cycle $T_f$ remains. That is, a change at the frequency equal to or higher than the fundamental frequency $F_f$ is attenuated, and a change at a frequency lower than the fundamental frequency $F_f$ remains.

The time point acquisition unit 303 has a function of acquiring the entry time point at which the formation moving object enters the structure and the exit time point at which the formation moving object exits from the structure, based on the time-series data $u_{lp}(k)$ after the vibration component is removed. That is, when the low-pass filter processing is performed as described above, the control unit 300 specifies, with the function of the time point acquisition unit 303, two consecutive pieces of data between which a predetermined threshold $C_L$ related to the deflection amount is from $u_{lp}(t)$. Here, the fact that the threshold $C_L$ is between the two consecutive pieces of data of $u_{lp}(t)$ means that the threshold $C_L$ is included in a range between the values of the two pieces of consecutively measured data of the displacement included in $u_{lp}(t)$, that is, a range from the smaller value of these pieces of data of the displacement to the larger value of these pieces of data of the displacement.

The threshold $C_L$ is a value of deflection generated in the unit bridge girder in accordance with the entry of the railway train into the unit bridge girder, and is, for example, a value of deflection at the observation point of the unit bridge girder when the railway vehicle is disposed such that the wheel of first axle at the head of the railway vehicle is placed in the vicinity of the entry end. The threshold $C_L$ may be another value as long as the threshold $C_L$ can be used for detecting the entry of the railway train into the unit bridge girder, and may be, for example, a deflection amount at the observation point of the unit bridge girder when a predetermined weight is applied to the vicinity of the entry end. The threshold $C_L$ may be a value of a predetermined ratio (for example, 10%, 1%, or the like) of the maximum value of the deflection amount at the observation point of the unit bridge girder when the railway train passes through the unit bridge girder. The threshold $C_L$ may be set to a value of any data included in $u_{lp}(t)$.

Figure 16:
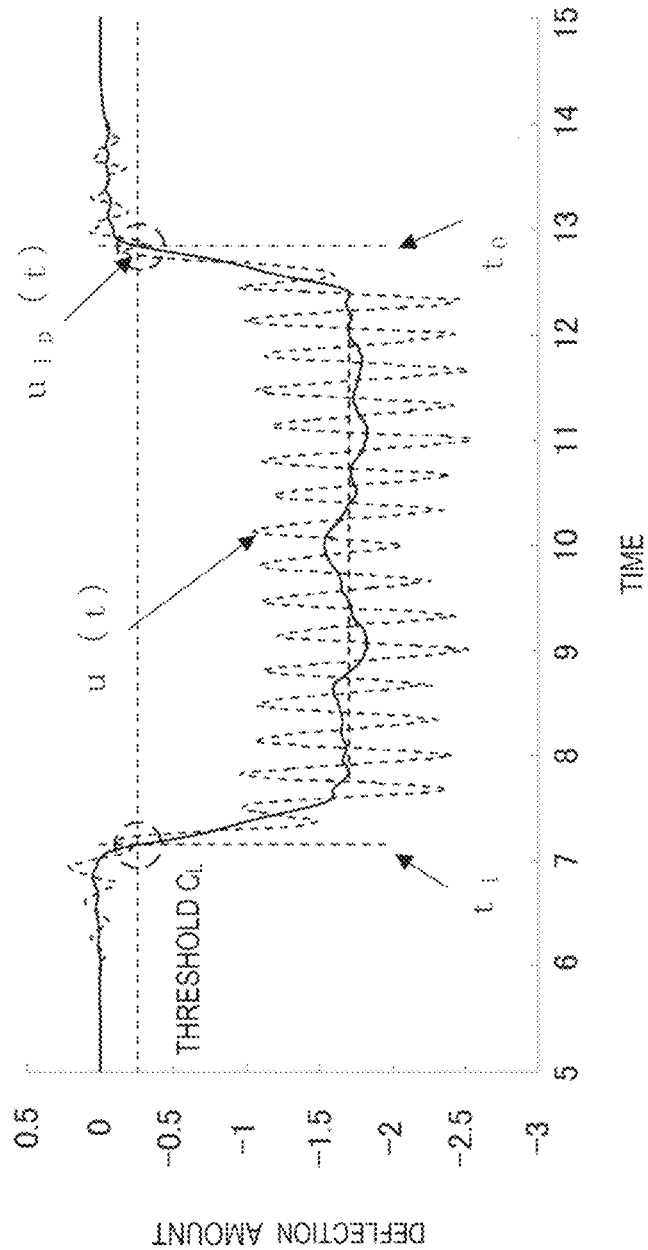
FIG. 16 is a diagram showing time-series data subjected to low-pass filter processing.
Figure 17:
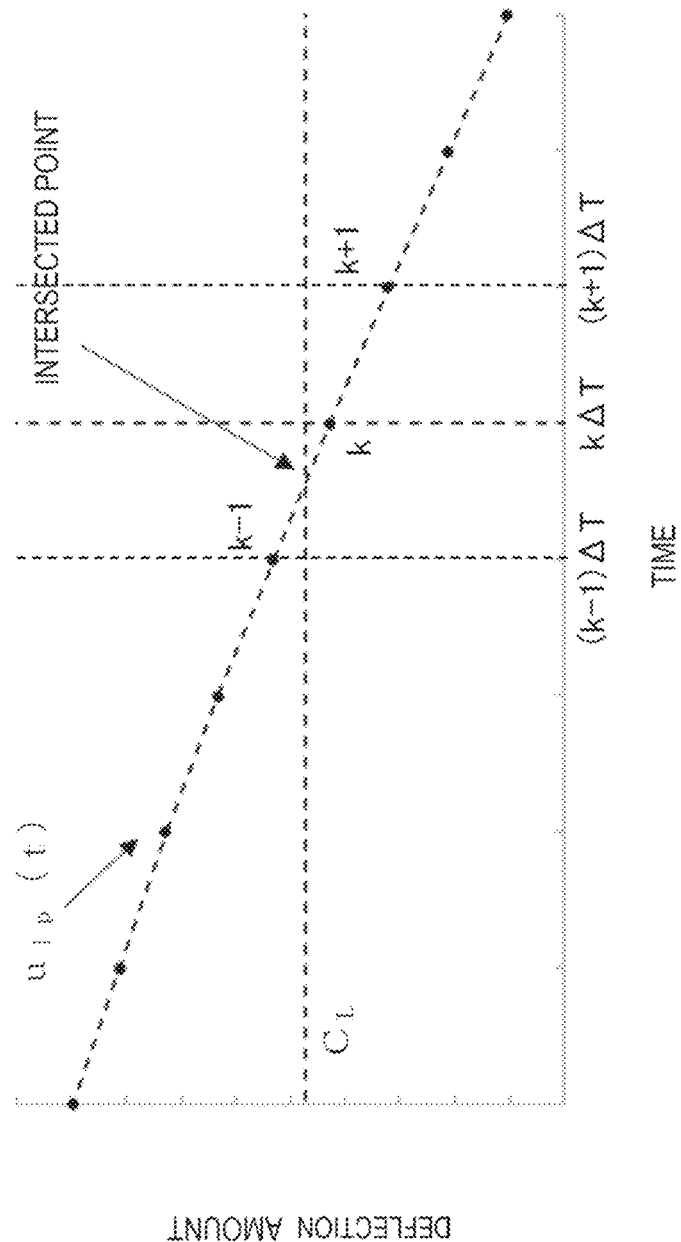
FIG. 17 is a diagram showing derivation processing of an entry time point and an exit time point.

FIG. 16 shows $u_{lp}(t)$ and the threshold $C_L$. In a graph of FIG. 16, a horizontal axis represents time ($t=k\Delta T$), and a vertical axis represents the deflection amount. A solid line in the graph of FIG. 16 indicates $u_{lp}(t)$, and a dotted line in the graph indicates $u(t)$. In portions surrounded by dotted circles in FIG. 16, $u_{lp}(t)$ and the threshold $C_L$ intersect with each other. FIG. 17 shows an enlarged view of a portion where $u_{lp}(t)$ and $C_L$ intersect with each other (a portion of a dotted circle on the left side in the graph of FIG. 16). In a graph of FIG. 17, a horizontal axis represents time, and a vertical axis represents the deflection amount. Black dots in FIG. 17 indicate data of discrete values included in $u_{lp}(t)$. In an example of FIG. 17, the threshold $C_L$ is between data k−1 and data k included in $u_{lp}(t)$.

The control unit 300 specifies a later one of two time points corresponding to the two consecutive pieces of data between which the specified $C_L$ is. In the example of FIG. 17, the control unit 300 specifies a time point $k\Delta T$ corresponding to the data k. In the example of FIG. 16, the control unit 300 also specifies two consecutive pieces of data between which $C_L$ is with respect to data in a portion of a dotted circle on the right side in FIG. 16, and specifies the later one of two time points corresponding to the specified two pieces of data. That is, the control unit 300 specifies the time point $k\Delta T$ corresponding to the data k at each of the entry time point and the exit time point. As a result, the data k and the time point $k\Delta T$ are acquired at each of the entry time point and the exit time point.

The control unit 300 acquires the earlier (smaller) value of the obtained k as data $k_i$ corresponding to the entry time point $t_i$ of the railway train 6 entering into the unit bridge girder. In addition, the control unit 300 acquires the later (larger) value of the obtained value of k as data $k_o$ corresponding to the exit time point $t_o$ of the railway train exiting from the unit bridge girder. In addition, the control unit 300 acquires $k_s$ corresponding to the passing period is as $k_s=k_o-k_i$. $t_s=k_s\Delta T$, $t_o=k_o\Delta T$, and $t_i=k_i\Delta T$.

In the example of FIG. 16, the control unit 300 acquires the entry time point $t_i=7.115$ [s] by multiplying the data $k_i$ by $\Delta T$, and acquires the exit time point $t_o=12.805$ [s] by multiplying the data $k_o$ by $\Delta T$. Further, by multiplying the variable $k_s$ by $\Delta T$, the passing period $t_s=5.69$ [s] is acquired. As described above, the control unit 300 acquires the entry time point, the exit time point, and the passing period using the $u_{lp}(k)$ in which the vibration component equal to or higher than the fundamental frequency is attenuated, thereby reducing an influence of the vibration component of a frequency equal to or higher than the fundamental frequency and more accurately acquiring the entry time point, the exit time point, and the passing period.

As described above, in the present embodiment, the control unit 300 acquires the later one of the two time points corresponding to the two consecutive pieces of data between which $C_L$ is, which are included in $u_{lp}(t)$, as the entry time point $t_i$ and the exit time point $t_o$. However, the control unit 300 may acquire other time points as the entry time point $t_i$ and the exit time point $t_o$. For example, the control unit 300 may specify, from $u_{lp}(t)$, two consecutive pieces of data between which the predetermined threshold $C_L$ related to the deflection amount is, and acquire, as the entry time point $t_i$ and the exit time point $t_o$, a time point that is during a period after one time point of the time points corresponding to the two specified pieces of data and before the other time point. In the example of FIG. 17, the control unit 300 may acquire, as the entry time point $t_i$, a time point after a time point $(k-1)\Delta T$ corresponding to the data k−1 and before the time point $k\Delta T$ corresponding to the data k (for example, time point $(k-1)\Delta T$, a time point corresponding to a point where $u_{lp}(t)$ and $C_L$ intersect with each other). In addition, the control unit 300 may obtain a curve obtained by interpolating data included in $u_{lp}(t)$, and obtain time points corresponding to intersection points of the obtained curve and $C_L$ as $t_i$ and $t_o$.

It is conceivable that one of two consecutive pieces of data between which $C_L$ included in $u_{lp}(t)$ is present is equal to $C_L$. For example, in the example of FIG. 17, the value of the data k may be equal to $C_L$. In this case, the control unit 300 may select any one of two sets, that is, a set of data equal to $C_L$ and data preceding the data and a set of data equal to $C_L$ and data following the data, as two consecutive pieces of data between which $C_L$ is. In the example of FIG. 17, when the data k is equal to the $C_L$, the control unit 300 selects any one of the two sets of the set of the data k−1 and the data k and the set of the data k and the data k+1 as two consecutive pieces of data between which $C_L$ is. The control unit 300 may acquire a time point in a period between two time points corresponding to two pieces of data included in the selected set as $t_i$ or $t_o$.

In the present embodiment, the control unit 300 acquires the time point associated with any data included in $u_{lp}(t)$ as the entry time point $t_i$ and the exit time point $t_o$. As a result, the control unit 300 can easily acquire and utilize the data of $u_{lp}(t)$ corresponding to each measurement time point of $\Delta T$ interval including the entry time point $t_i$ and the exit time point $t_o$ by referring to $u_{lp}(t)$. On the other hand, when acquiring the time point not associated with any data included in $u_{lp}(t)$ as the entry time point $t_i$ and the exit time point $t_o$, the control unit 300 obtains the data of $u_{lp}(t)$ corresponding to each measurement time point of the $\Delta T$ interval including $t_i$ and $t_o$ by resampling from the original $u_{lp}(t)$ or the like, which increases time and effort of processing. The control unit 300 acquires the entry time point and the exit time point by using $u_{lp}(t)$ in which a vibration component of a frequency equal to or higher than the fundamental frequency is attenuated, thereby reducing an influence of the vibration component of a frequency equal to or higher than the fundamental frequency and more accurately acquiring the entry time point and the exit time point.

Figure 14:
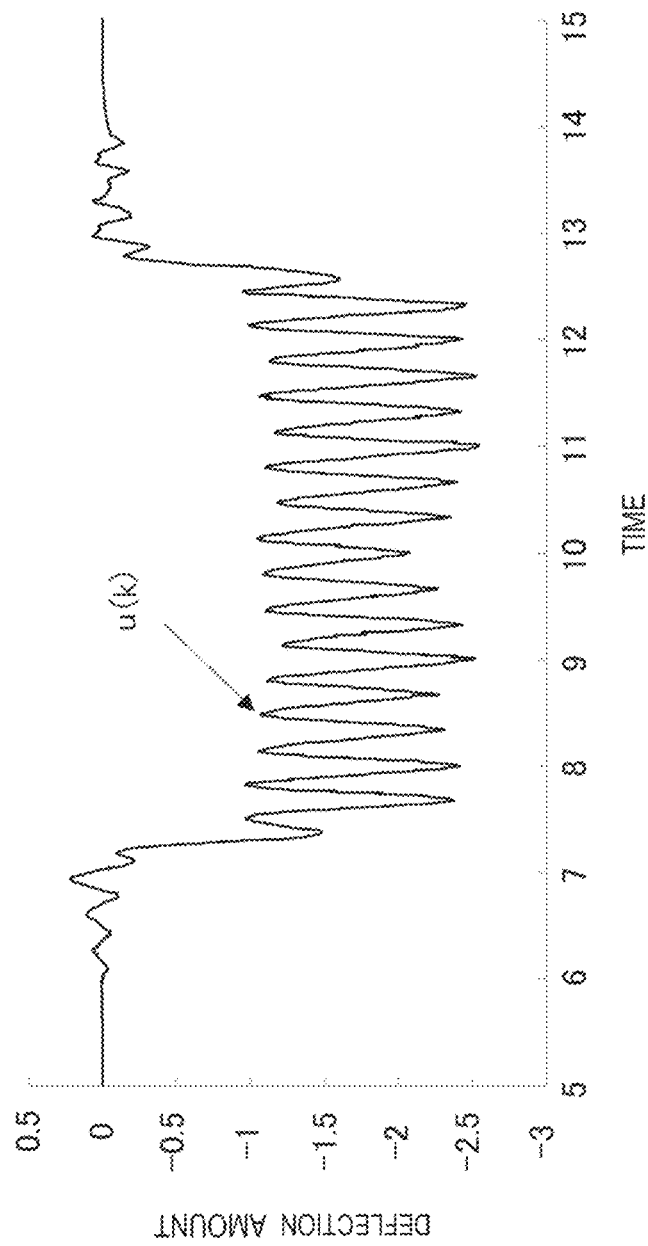
FIG. 14 is a diagram showing time-series data of a displacement of the unit bridge girder.
Figure 15:
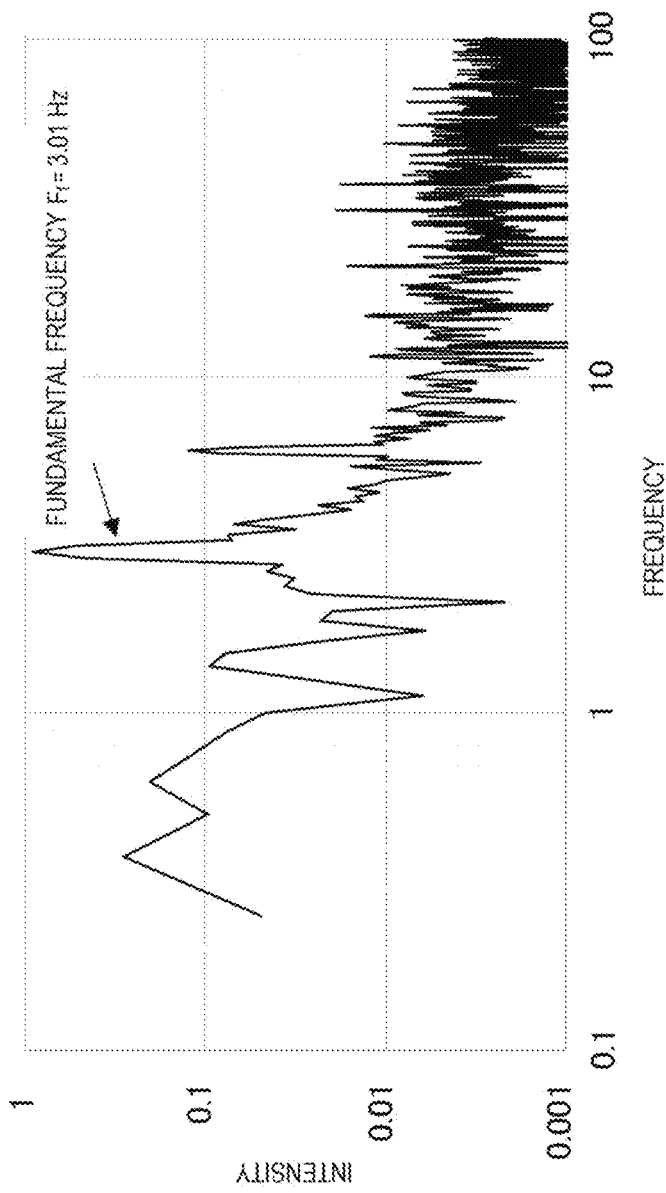
FIG. 15 is a diagram showing the FFT result of the time-series data.

In $u(k)$ shown in FIG. 14, high-frequency vibration corresponds to deflection generated in the unit bridge girder mainly due to the load of the railway vehicle, but more complicated vibration may be superimposed depending on a specification of the unit bridge girder, a specification of the railway vehicle, or the like. Examples of such vibration include resonance. That is, when the vibration generated in the unit bridge girder due to the passage of the railway train approximates the natural frequency of the unit bridge girder, the natural frequency or harmonic vibration of the natural frequency may be excited in the unit bridge girder due to the passage of the railway train.

Figure 18:
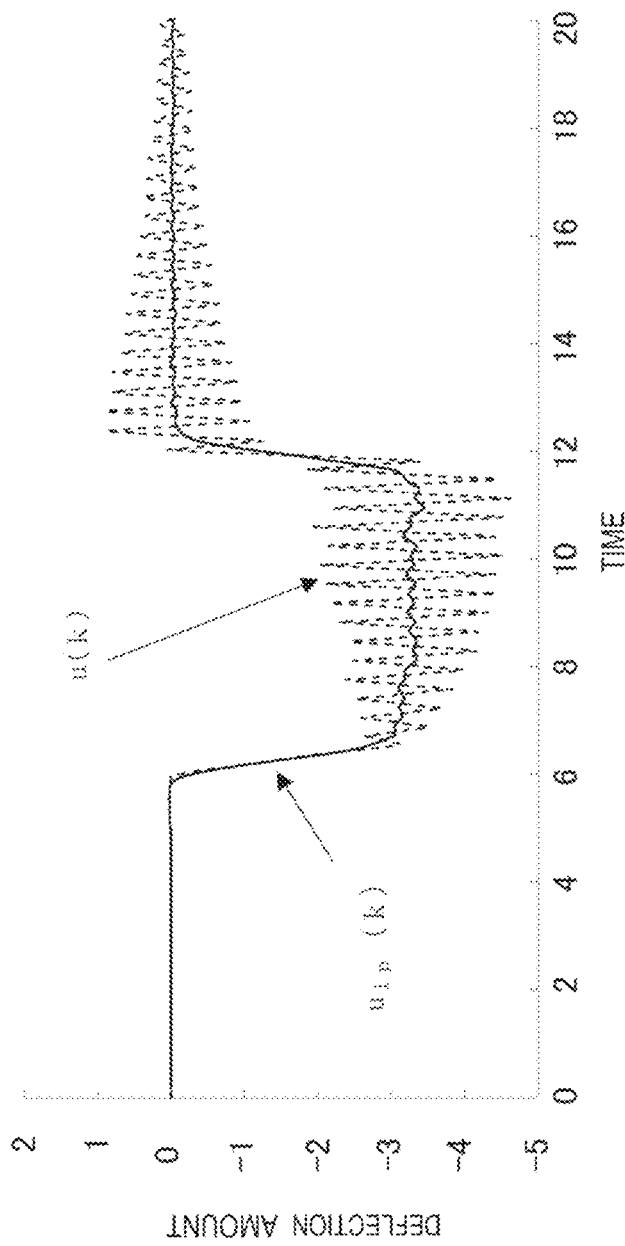
FIG. 18 is a diagram showing time-series data obtained by subjecting time-series data including drift noise to low-pass filter processing.

In FIG. 18, the time-series data u(k) when resonance occurs is indicated by a dotted line. In FIG. 18, a horizontal axis represents time, a vertical axis represents the deflection amount, and the time-series data u(k) is indicated by a dotted line. Even when complicated vibrations are superimposed as described above, the control unit 300 can accurately acquire, with the function of the removal unit 302, the entry time point and the exit time point by performing the vibration by the low-pass filter processing. For example, the control unit 300 acquires the time-series data $u_{lp}(k)$ after the low-pass filter processing by processing of Equation (35) to Equation (37). In FIG. 18, the time-series data $u_{lp}(k)$ after the low-pass filter processing is indicated by a solid line. The natural frequency of the unit bridge girder may be different from the frequency of the deflection generated in the unit bridge girder due to the load of the railway vehicle. Therefore, when the frequencies of both vibrations are close to each other, for example, in Equation (35) to Equation (37), a moving average may be acquired for a vibration having a larger amplitude. Of course, the low-pass filter processing may be performed in two steps so as to remove the vibrations.

The number acquisition unit 304 has a function of acquiring the number of railway vehicles included in the railway train 6 based on u(k), which is time-series data acquired by the function of the data acquisition unit 301, and the entry time point $t_i$ and the exit time point $t_o$ acquired by the function of the time point acquisition unit 303. That is, based on $t_i$ and $t_o$, the control unit 300 derives the passing period $t_s$ during which the railway train 6 passes through the unit bridge girder using Equation (1). Then, the control unit 300 derives the wave number v of the fundamental frequency $F_f$ included in the passing period is using Equation (33) based on the derived $t_s$ and the fundamental frequency $F_f$ derived based on u(k). Based on the derived v, the control unit 300 derives the number N of railway vehicles included in the railway train 6 using Equation (34). Here, since $t_s$=5.69 [s] and $F_f$=3.01 [Hz], the control unit 300 acquires the number N of railway vehicles as round ((5.69)×3.01-1)=round (16.13)=16.

(2) Derivation Processing

Figure 19:
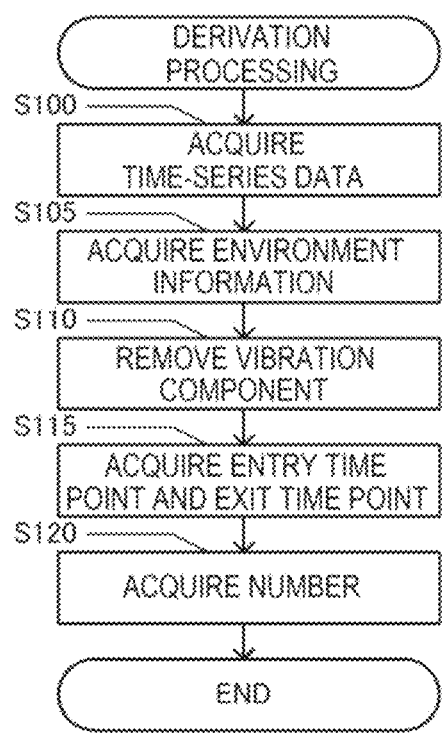
FIG. 19 is a flowchart showing the derivation processing.

Next, processing of deriving the number of railway vehicles of the railway train 6 performed by the server device 3 will be described with reference to FIG. 19. The server device 3 starts processing in FIG. 19 in response to the fact that the data of the displacement at the observation point is transmitted from the measurement device 1, but may start the processing in FIG. 19 at any timing such as a designated timing. In S100, the control unit 300 acquires the time-series data u(k) of the deflection generated at the observation point from the measurement device 1 by the function of the data acquisition unit 301. S100 is an example of a data acquisition step.

In S105, the control unit 300 acquires information on the bridge length $L_B$ of the unit bridge girder, the vehicle length $L_C$ of each railway vehicle of the railway train 6, and the distance $L_a$ indicating the position of each railway vehicle of the railway train 6 as the environment information. The environmental information may be stored in the storage unit 310 in advance, or may be input by a user or the like.

In S110, the control unit 300 removes the vibration component by the function of the removal unit 302. That is, the control unit 300 executes the FFT on u(k) acquired in S100. The control unit 300 detects peaks from the FFT result. The control unit 300 specifies, among the detected peaks, a peak corresponding to a minimum frequency obtained by excluding a peak of a side lobe generated due to an influence of a window function used in the FFT. The control unit 300 acquires the frequency corresponding to the specified peak as the fundamental frequency $F_f$ of the time-series data u(k). Further, the control unit 300 performs the low-pass filter processing on the time-series data u(k) using Equation (35) to Equation (37), and acquires the time-series data $u_{lp}(k)$ from which the vibration component is removed. S110 is an example of a removing step.

In S115, the control unit 300 acquires the entry time point and the exit time point with the function of the time point acquisition unit 303. That is, the control unit 300 compares $u_{lp}(k)$ derived in S110 with the predetermined threshold $C_L$ related to the deflection amount, specifies two pieces of data between which the threshold $C_L$ is from $u_{lp}(k)$, and performs processing of acquiring the data k from one of the two pieces of data on the entry time point and the exit time point to obtain the values of the two pieces of k.

Then, the control unit 300 acquires the smaller one of the obtained values of k as the data $k_i$ corresponding to the entry time point $t_i$ of the railway train 6 entering into the unit bridge girder. In addition, the control unit 300 acquires the larger one of the obtained values of k as the data $k_o$ corresponding to the exit time point $t_o$ of the railway train 6 exiting from the unit bridge girder. Then, the control unit 300 obtains the entry time point $t_i$ and the exit time point $t_o$ from a relationship between to $=k_o\Delta T$ and $t_i=k_i\Delta T$. S115 is an example of a time point acquisition step.

In S120, with the function of the number acquisition unit 304, the control unit 300 acquires the number of railway vehicles included in the railway train 6 based on the time-series data u(k) acquired in S100 and the entry time point $t_i$ and the exit time point $t_o$ acquired in S115. That is, the control unit 300 derives the passing period is using Equation (1) based on $t_i$ and $t_o$. Then, the control unit 300 derives the wave number v of the fundamental frequency $F_f$ included in the passing period is using Equation (33). Based on the derived v, the control unit 300 derives the number N of railway vehicles included in the railway train 6 using Equation (34).

(3-1) Second Embodiment

As described in the above embodiment, when the time-series data u(k), which is the observation data of the deflection amount $T_{std}(t)$, is considered to follow the deflection model, the number N of railway vehicles can be acquired. However, in order to acquire the number N of railway vehicles, it is necessary to acquire the entry time point $t_i$ and the exit time point $t_o$, which are the observation information. Therefore, an accuracy of the entry time point $t_i$ and the exit time point $t_o$ greatly influences an accuracy of the number N of railway vehicles.

Figure 20:
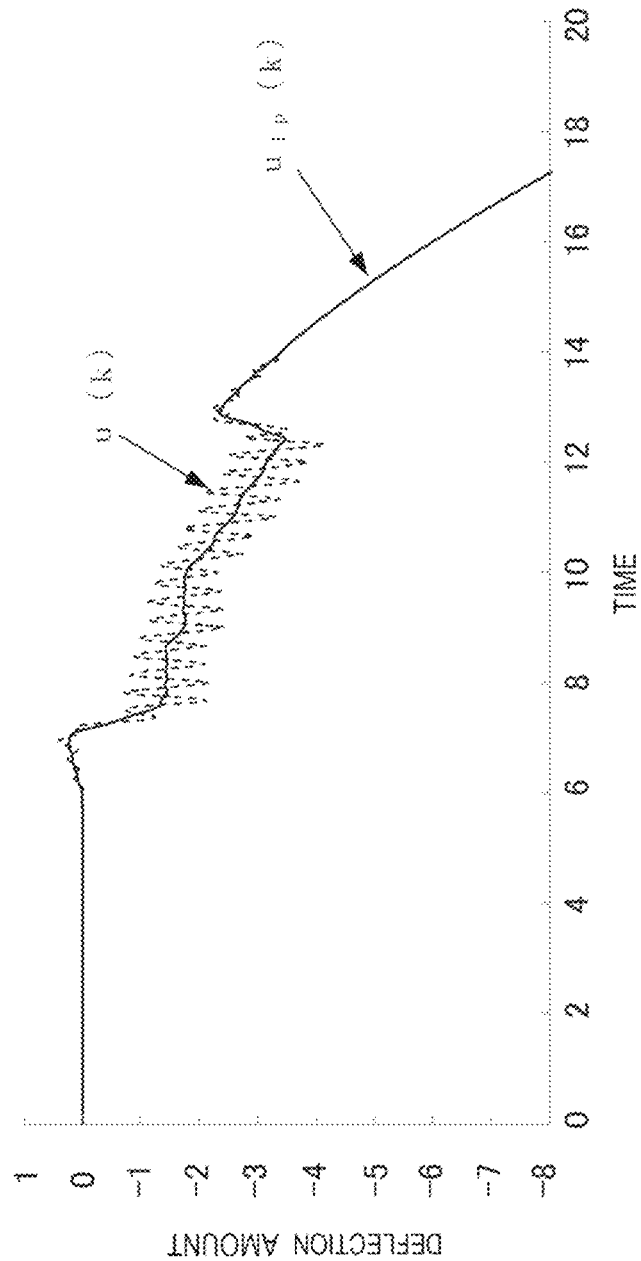
FIG. 20 is a diagram showing a measurement example of the time-series data including the drift noise.

A configuration for acquiring the entry time point $t_i$ and the exit time point $t_o$ from the time-series data u(k) with high accuracy is not limited to a configuration in which the time-series data u(k) is compared with the threshold $C_L$ as in the above embodiment. FIG. 20 is a diagram showing a measurement example of the time-series data u(k). In FIG. 20, a horizontal axis represents time, a vertical axis represents the deflection amount, and a dotted line represents the measurement example of the time-series data u(k). This example is a measurement example when drift noise exists in the sensor device 2. That is, the detected value of the acceleration or the like may shift in a specific direction (a negative direction of the deflection amount in FIG. 20) with time due to a drift having a constant tendency.

When such drift noise exists, the time-series data $u_{lp}(k)$ after the low-pass filter processing as shown in the above Equation (37) becomes data as shown by a solid line in FIG. 20. Therefore, it is difficult to acquire the entry time point $t_i$ and the exit time point $t_o$ by comparing the time-series data $u_{lp}(k)$ with a certain threshold. Therefore, when the drift noise exists, it is conceivable to generate time-series data from which the influence of the drift noise is removed such that the entry time point $t_i$ and the exit time point $t_o$ can be acquired in comparison with a certain threshold.

Figure 13:
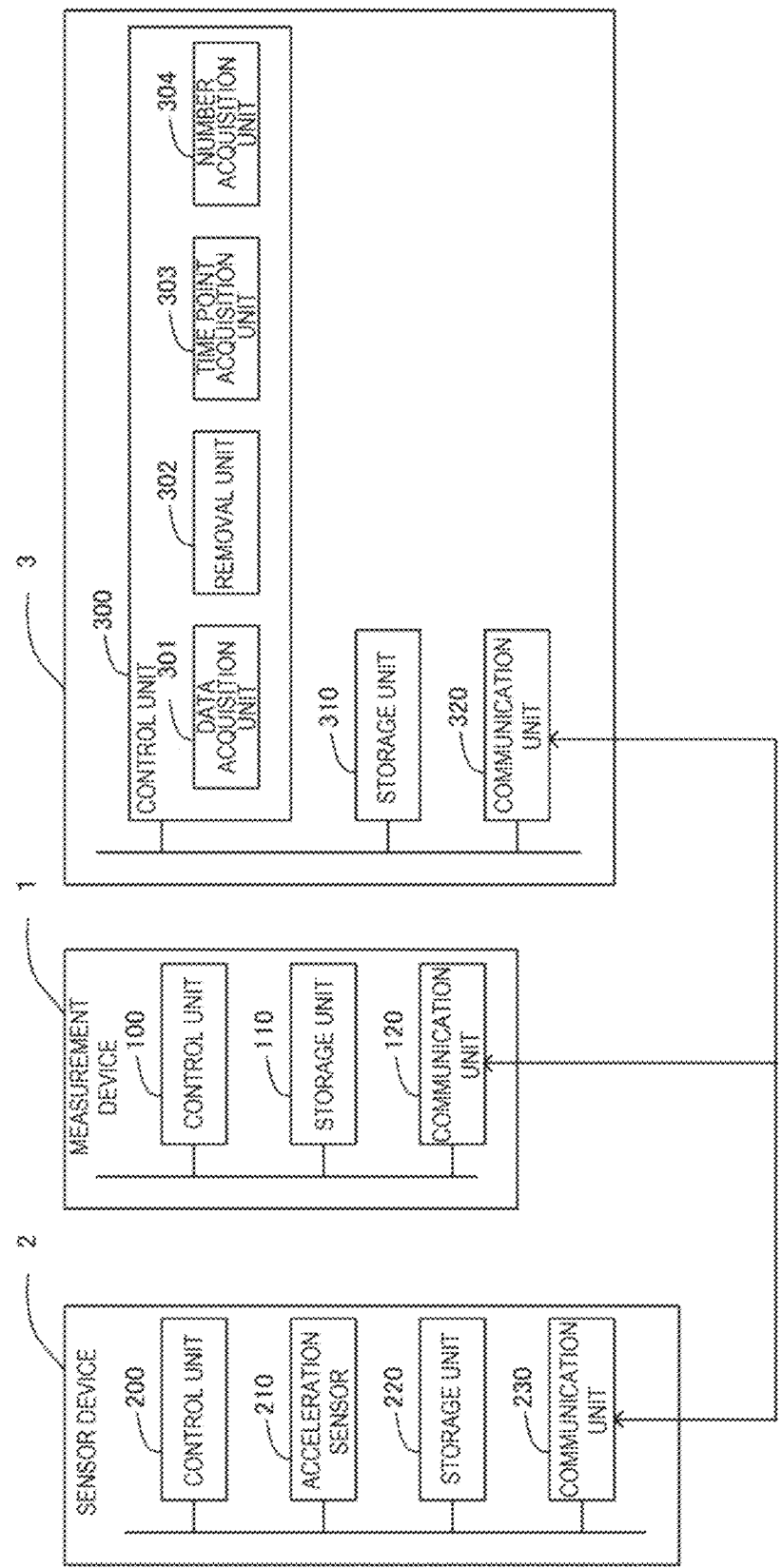
FIG. 13 is a diagram showing a configuration of a time point acquisition system.

A configuration for performing such processing can be implemented by changing the processing of the time point acquisition unit 303 in the configuration shown in the above-described FIG. 13. That is, with the function of the time point acquisition unit 303, the control unit 300 performs the high-pass filter processing on the time-series data on which the low-pass filter processing was performed, inverts a sign, compares the sum of the time-series data before the sign is inverted and the time-series data after the sign is inverted with a predetermined threshold, specifies two pieces of time-series data between which the threshold is, and performs processing of acquiring the data k from one of the two pieces of time-series data on the entry time point and the exit time point to obtain the values of the two pieces of k. Then, the control unit 300 acquires the entry time point and the exit time point from these values of k. The low-pass filter processing performed by the removal unit 302 is the same as that in the above embodiment.

Figure 21:
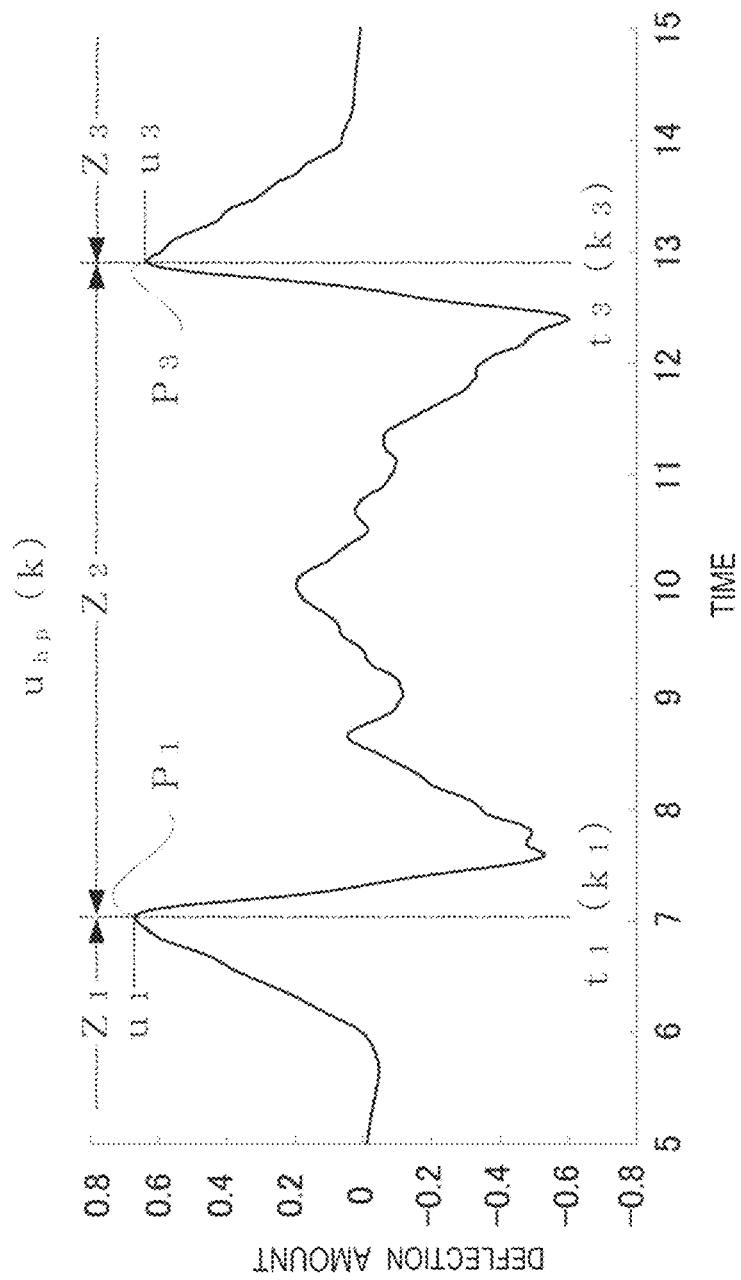
FIG. 21 is a diagram showing time-series data subjected to the high-pass filter processing.

Specifically, the control unit 300 performs the high-pass filter processing on the time-series data $u_{lp}(k)$ after low-pass filter processing obtained by Equation (37). Hereinafter, the time-series data after the high-pass filter processing is referred to as $u_{hp}(k)$. FIG. 21 shows the time-series data $u_{hp}(k)$ obtained by performing the high-pass filter processing on the time-series data $u_{lp}(k)$ after the low-pass filter processing shown by the solid line in FIG. 20.

The time-series data from which the vibration component was removed has a schematic shape like a downwardly convex staircase function as in the time-series data $u_{lp}(k)$ in FIG. 16. Also in the time-series data $u_{hp}(k)$ after the high-pass filter processing shown in FIG. 21, a feature of the time-series data from which the vibration component was removed should appear. Therefore, the control unit 300 divides the time space into three intervals, and corrects the shape of the time-series data $u_{hp}(k)$ in each interval, thereby generating data such as the time-series data $u_{lp}(k)$ in FIG. 16.

In the high-pass filter processing, filtering may be performed such that a feature for generating the downwardly convex staircase function remains. The high-pass filter processing may be performed by various methods, and for example, the high-pass filter processing may be performed by the time-series data u(k) to the time-series data $u_{lp}(k)$. When the time-series data $u_{lp}(k)$ is used for a calculation of the high-pass filter processing, the moving average interval may be subjected to the moving average in a cycle that is a natural number multiple of the basic cycle. Alternatively, the high-pass filter processing may be performed by an FIR filter or the like having a cutoff frequency lower than the fundamental frequency.

In FIG. 21, the intervals divided into three intervals are shown as a first interval $Z_1$, a second interval $Z_2$, and a third interval $Z_3$. That is, the first interval $Z_1$ is an interval equal to or less than a time point $t_1$ (corresponding to a variable $k_1$) at which a first peak $P_1$ that is earlier in a time axis appears among upwardly convex peaks in the time-series data $u_{hp}(k)$. The third interval $Z_3$ is an interval that is equal to or greater than a time point $t_3$ (corresponding to a variable $k_3$) at which a second peak $P_3$ that is later in the time axis appears among the upwardly convex peaks in the time-series data $u_{hp}(k)$. The second interval $Z_2$ is an interval between the first peak $P_1$ and the second peak $P_3$ that are upwardly convex peaks in the time-series data $u_{hp}(k)$, that is, an interval between the time point $t_1$ (corresponding to the variable $k_1$) and the time point $t_3$ (corresponding to the variable $k_3$). In FIG. 21, coordinates of the first peak $P_1$ are $(k_1, u_1)$, and coordinates of the second peak $P_3$ are $(k_3, u_3)$.

Here, it is assumed that a correction curve for correcting the time-series data $u_{hp}(k)$ is Mcc(k), and curves for representing the correction curve of the respective intervals are $Mcc_1(k)$, $Mcc_2(k)$, and $Mcc_3(k)$. That is, the correction curve Mcc (k) is equal to $Mcc_1(k)+Mcc_2(k)+Mcc_3(k)$, and is represented by the following Equation (38).

$$M_{CC}(k) = \begin{cases} k \le k_1 & M_{CC1}(k) \\ k_1 < k < k_3 & M_{CC2}(k) \\ k_3 \le k & M_{CC3}(k) \end{cases} \quad (38)$$

The control unit 300 inverts the sign of the time-series data $u_{hp}(k)$ in the first interval $Z_1$ and the third interval $Z_3$ to acquire the correction curve $Mcc_1(k)$ of the first interval and the correction curve $Mcc_3(k)$ of the third interval. That is, the correction curves $Mcc_1(k)$ and $Mcc_3(k)$ are represented by Equation (39) and Equation (40), respectively.

$$M_{CC1}(k) = \begin{cases} k \le k_1 & -u_{hp}(k) \\ k_1 < k & 0 \end{cases} \quad (39)$$

$$M_{CC3}(k) = \begin{cases} k < k_3 & 0 \\ k_3 \le k & -u_{hp}(k) \end{cases} \quad (40)$$

Figure 22:
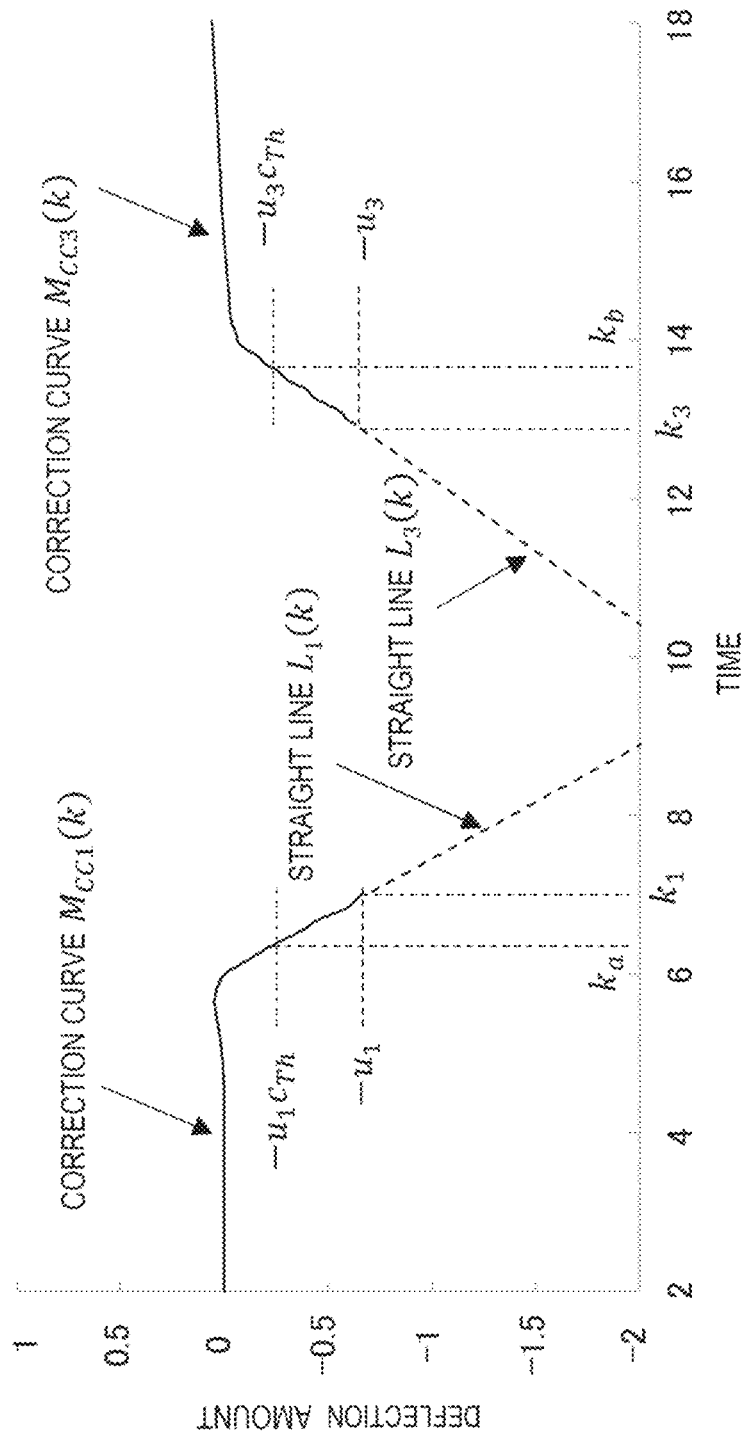
FIG. 22 is a diagram showing a correction curve generated by polarity inversion.

In FIG. 22, the correction curves $Mcc_1(k)$ and $Mcc_3(k)$ generated by the inversion of the sign are indicated by solid lines in the first interval $Z_1$ and the third interval $Z_3$. The correction curve $Mcc_2(k)$ in the second interval is generated so as to be continuous from the correction curves $Mcc_1(k)$ and $Mcc_3(k)$. As shown in FIG. 22, the correction curve $Mcc_1(k)$ linearly changes in the vicinity of a boundary between the first interval $Z_1$ and the second interval $Z_2$. The correction curve $Mcc_3(k)$ linearly changes in the vicinity of a boundary between the third interval $Z_3$ and the second interval $Z_2$.

Therefore, the control unit 300 regards the correction curve $Mcc_2(k)$ of the second interval $Z_2$ as a straight line in the vicinity of the boundary between the first interval $Z_1$ and the second interval $Z_2$ and in the vicinity of the boundary between the third interval $Z_3$ and the second interval $Z_2$. In the present embodiment, the control unit 300 acquires an approximate curve with respect to the correction curve $Mcc_1(k)$ in which the variable k is from a predetermined value $k_a$ to the value $k_1$, and regards the approximate curve as the correction curve $Mcc_2(k)$ in the vicinity of the value $k_1$ in the second interval by extending the approximate curve to a range of $k>k_1$.

Therefore, the control unit 300 acquires the value of the correction curve $Mcc_1(k)$ at the value $k_1$, that is, $-u_1 \cdot c_{Th}$ which is a value obtained by multiplying $-u_1$, which is a value obtained by inverting the sign of the amplitude of the first peak, by a predetermined first coefficient $c_{Th}$, and sets the value of the variable k at which the correction curve $Mcc_1(k)$ is closest to the value $-u_1 \cdot c_{Th}$, as $k_a$. FIG. 22 shows $k_1$, $k_a$, $-u_1$, and $-u_1 \cdot c_{Th}$. The predetermined coefficient $c_{Th}$ is a value determined in advance in a range of $0 < c_{Th} < 1$.

The control unit 300 acquires the first straight line that is the approximate straight line of the correction curve $Mcc_1(k)$ in a range of $k_a$ to $k_1$. The straight line may be specified by various methods, and in the present embodiment, the control unit 300 specifies the straight line by the least squares method. That is, the control unit 300 assumes $L_1(k) = s_1 k + i_1$ as an equation of the straight line, and obtains a coefficient $s_1$ and a constant term $i_1$ by minimizing an error $e_k$ shown in Equation (41). In FIG. 22, the straight line $L_1(k)$ is indicated by a broken line.

$$M_{CC1}(k) - (s_1 k + i_1) = e_k \qquad (41)$$

With a known calculation method, assuming that the number of samples from the value $k_a$ to $k_1$ is n as in Equation (42), the coefficient $s_1$ is represented by the following Equation (43), and the constant term $i_1$ is represented by the following Equation (44).

$$n = \sum_{k=k_a}^{k_1} 1 \qquad (42)$$

$$s_1 = \left\{ n \sum_{k=k_a}^{k_1} k M_{CC1}(k) - \sum_{k=k_a}^{k_1} k \sum_{k=k_a}^{k_1} M_{CC1}(k) \right\} / \left\{ n \sum_{k=k_a}^{k_1} k^2 - \sum_{k=k_a}^{k_1} k \sum_{k=k_a}^{k_1} k \right\} \qquad (43)$$

$$i_1 = \left\{ \sum_{k=k_a}^{k_1} M_{CC1}(k) - s_1 \sum_{k=k_a}^{k_1} k \right\} / n \qquad (44)$$

The same processing is performed in the vicinity of the boundary between the third interval $Z_3$ and the second interval $Z_2$. That is, the control unit 300 acquires an approximate curve with respect to the correction curve $Mcc_3(k)$ in which the variable k is from the value $k_3$ to a predetermined value kb, and regards the approximate curve as the correction curve $Mcc_2(k)$ in the vicinity of the value $k_3$ in the second interval by extending the approximate curve to a range of $k < k_3$.

Therefore, the control unit 300 acquires the value of the correction curve $Mcc_3(k)$ at the value $k_3$, that is, $-u_3 \cdot c_{Th}$ which is a value obtained by multiplying $-u_3$, which is a value obtained by inverting the sign of the amplitude of the third peak, by a predetermined third coefficient $c_{Th}$, and sets the value of the variable k at which the correction curve $Mcc_3(k)$ is closest to the value $-u_3 \cdot c_{Th}$, as kb. FIG. 22 shows $k_3$, $k_b$, $-u_3$, and $-u_3 \cdot c_{Th}$ Here as well, the predetermined coefficient $c_{Th}$ is a value determined in advance in the range of $0 < c_{Th} < 1$.

The control unit 300 acquires a third straight line which is an approximate straight line of the correction curve $Mcc_3(k)$ in a range of $k_3$ to kb. The straight line may be specified by various methods, and in the present embodiment, the control unit 300 specifies the straight line by the least squares method. That is, the control unit 300 assumes $L_3(k) = s_3 k + i_3$ as the equation of the straight line, and obtains a coefficient $s_3$ and a constant term $i_3$ by minimizing the error $e_k$ shown in Equation (45). In FIG. 22, the straight line $L_3(k)$ is indicated by a broken line.

$$M_{CC3}(k) - (s_3 k + i_3) = e_k \qquad (45)$$

With a known calculation method, assuming that the number of samples from the value $k_a$ to $k_3$ is n as in Equation (46), the coefficient $s_3$ is represented by the following Equation (47), and the constant term $i_3$ is represented by the following Equation (48).

$$n = \sum_{k=k_3}^{k_b} 1 \qquad (46)$$

$$s_3 = \left\{ n \sum_{k=k_3}^{k_b} k M_{CC3}(k) - \sum_{k=k_3}^{k_b} k \sum_{k=k_3}^{k_b} M_{CC3}(k) \right\} / \left\{ n \sum_{k=k_3}^{k_b} k^2 - \sum_{k=k_3}^{k_b} k \sum_{k=k_3}^{k_b} k \right\} \qquad (47)$$

$$i_3 = \left\{ \sum_{k=k_3}^{k_b} M_{CC3}(k) - s_3 \sum_{k=k_3}^{k_b} k \right\} / n \qquad (48)$$

Figure 23:
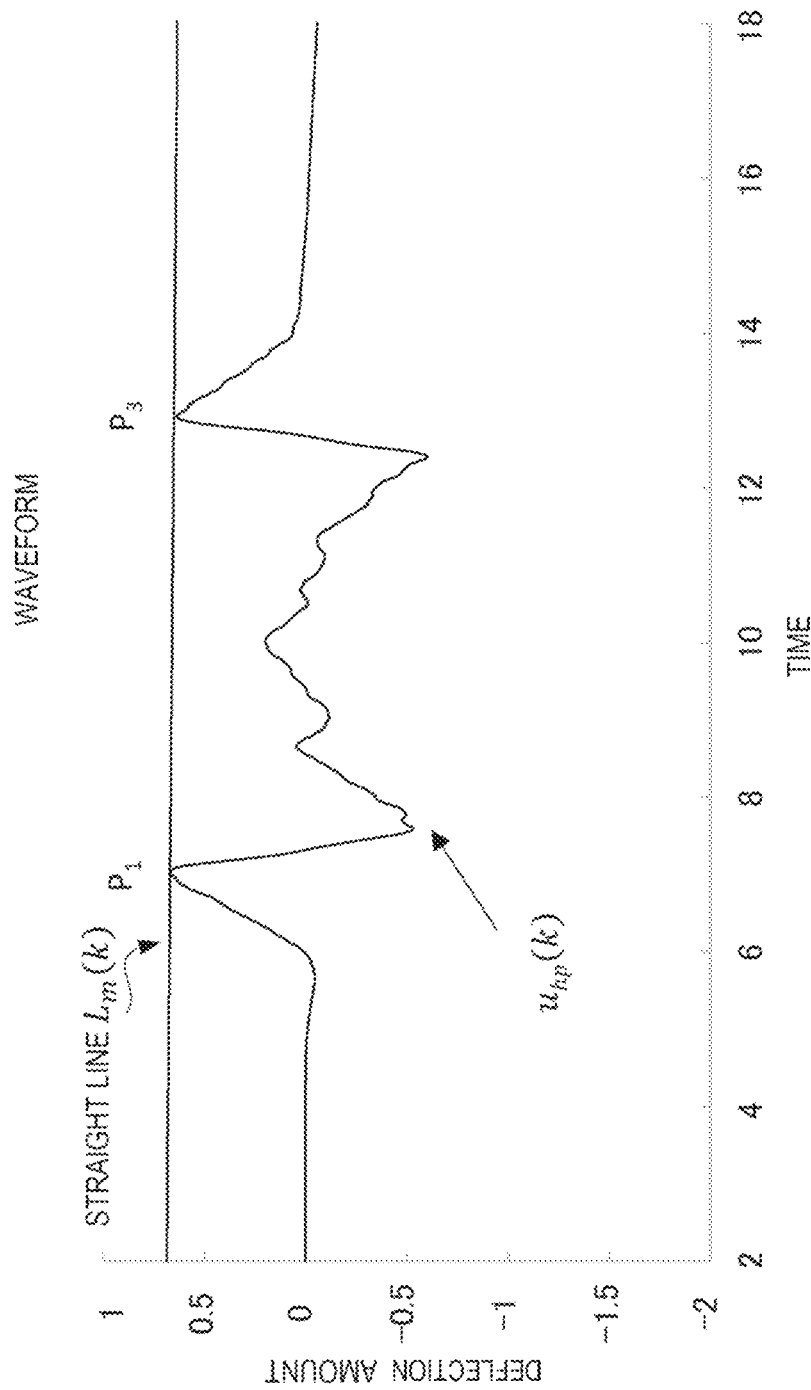
FIG. 23 is a diagram showing a straight line serving as a basis of the correction curve.

Next, the control unit 300 performs an interpolation between the straight lines $L_1(k)$ and $L_3(k)$ with a straight line $L_2(k)$. The interpolation may be performed by various methods. In the present embodiment, the control unit 300 acquires the straight line $L_2(k)$ using a straight line $L_m(k)$ coupling the first peak $P_1$ and the second peak $P_3$ of the time-series data $u_{hp}(k)$ shown in FIG. 21. FIG. 23 is a diagram showing the straight line Lm(k). Since the straight line Lm(k) is a straight line coupling the first peak $P_1$ and the second peak $P_3$, the control unit 300 acquires the straight line $L_m(k)$ by the following Equation (49) using the coordinates($k_1$, $u_1$) and ($k_3$, $u_3$) of the first peak $P_1$ and the second peak $P_3$.

$$L_C(k) = \frac{u_1 - u_3}{k_1 - k_3} k + u_1 - \frac{u_1 - u_3}{k_1 - k_3} k_1 \qquad (49)$$

The control unit 300 estimates that a shape of the straight line $L_m(k)$ is similar to a base shape of a shape like the downwardly convex staircase function, and generates the straight line $L_2(k)$ which is the second straight line by multiplying the straight line $L_m(k)$ by the predetermined second coefficient $C_2$. That is, the straight line $L_2(k)$ is acquired by Equation (50).

$$L_2(k) = s_2 k + i_2 = C_2 L_C(k) \qquad (50)$$

Here, the coefficient $C_2$ may be various values, and in the present embodiment, the coefficient $C_2$ is a value selected from a range of $-4 < C_2 < -2$. Within this range, even if an amplitude (difference in a positive direction from the deflection amount of 0) of the first peak $P_1$ and the second peak $P_3$ of $u_{hp}(k)$ of the time-series data after the high-pass filter processing becomes small due to the influence of the high-pass filter processing, it is possible to generate the base of the shape like the downwardly convex staircase function.

Figure 24:
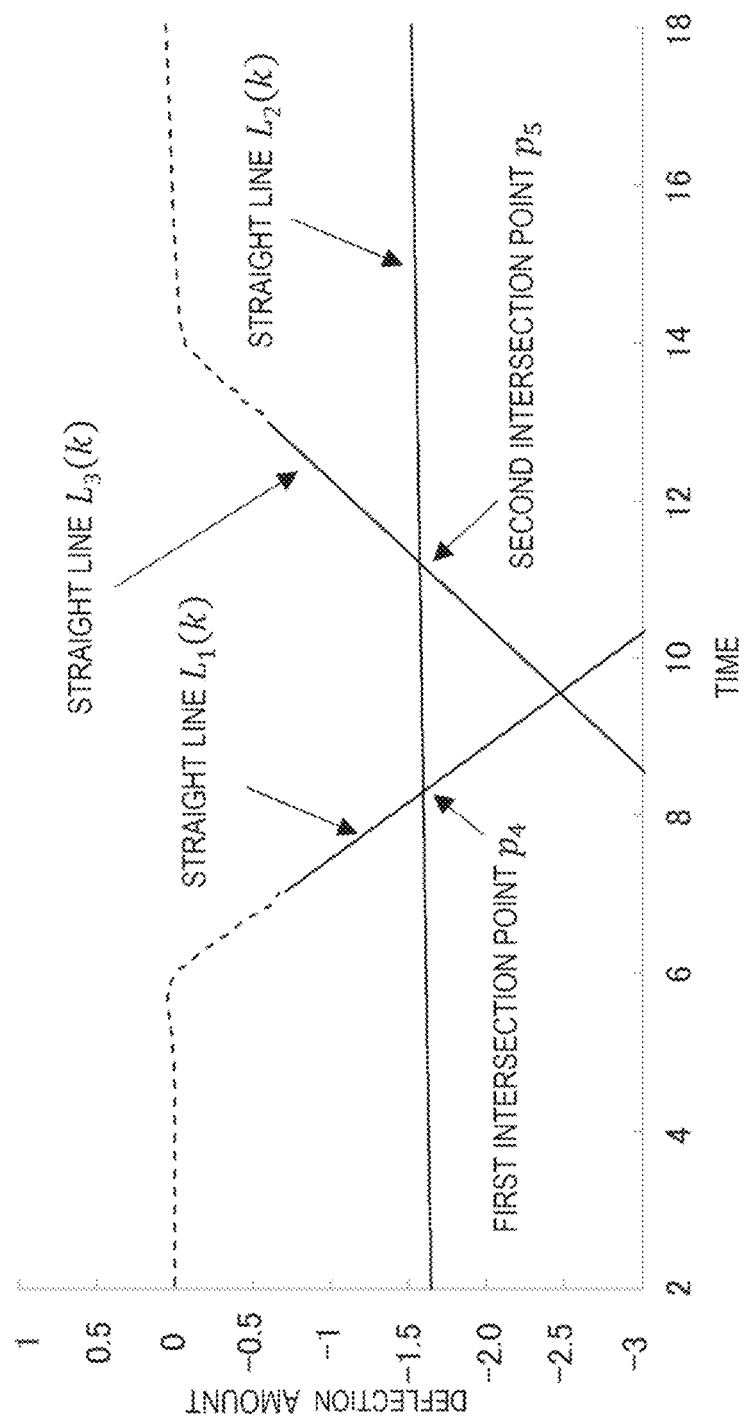
FIG. 24 is a diagram showing generation of the correction curve.

As described above, when the straight lines $L_1(k)$, $L_2(k)$, and $L_3(k)$ are generated, the control unit 300 acquires an intersection point (or a point closest to the intersection point) of these straight lines. That is, the control unit 300 acquires a first intersection point $p_4(k_4, u_4)$ which is an intersection point of the straight lines $L_1(k)$ and $L_2(k)$, and a second intersection point $p_5(k_5, u_5)$ which is an intersection point of the straight lines $L_2(k)$ and $L_3(k)$. FIG. 24 is a diagram showing a relationship between these straight lines and intersection points. These intersection points can be represented as the following Equation (51) and Equation (52) based on Equation (41) to Equation (50).

$$p_4 = (k_4, u_4) = \left(\frac{i_2 - i_1}{s_1 - s_2}, s_1\frac{i_2 - i_1}{s_1 - s_2} + i_1\right) \quad (51)$$

$$p_5 = (k_5, u_5) = \left(\frac{i_3 - i_2}{s_2 - s_3}, s_2\frac{i_3 - i_2}{s_2 - s_3} + i_2\right) \quad (52)$$

Figure 25:
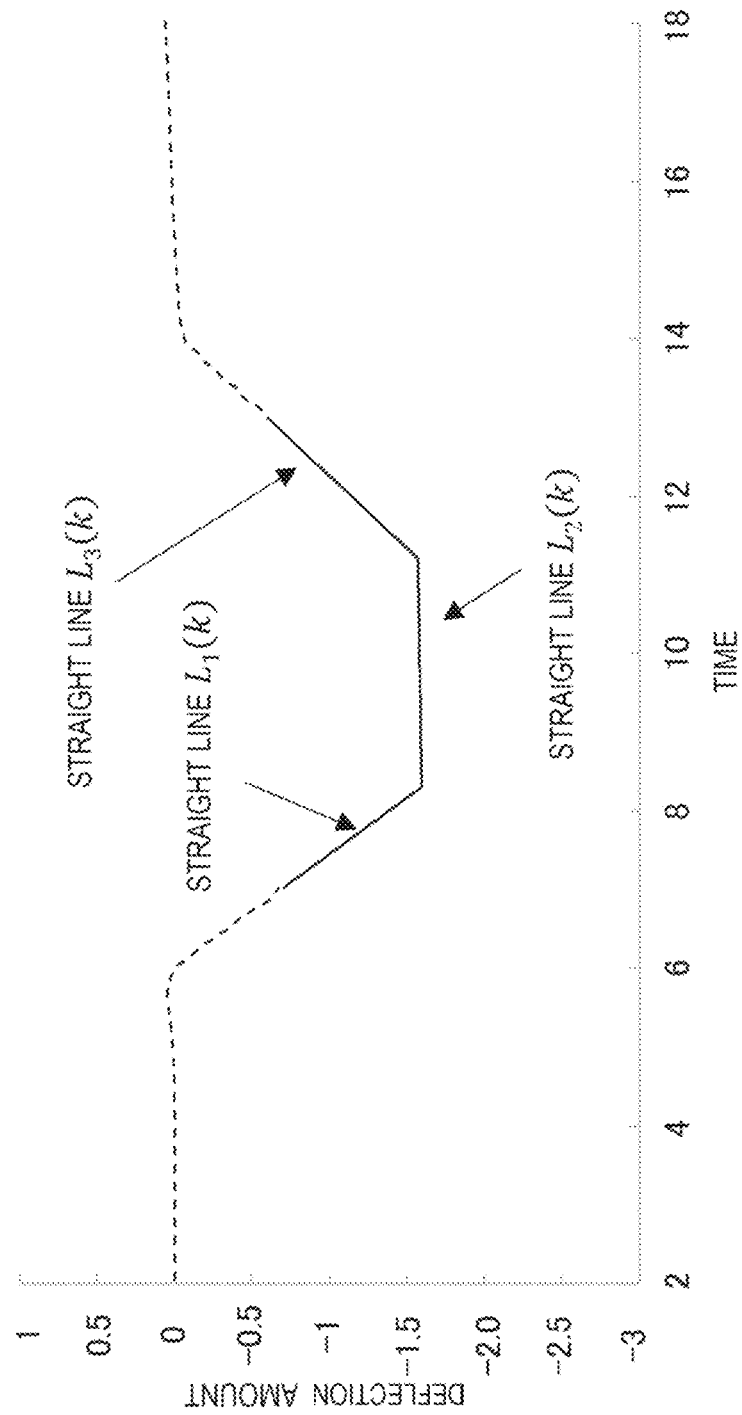
FIG. 25 is a diagram showing an example of the correction curve.

When the intersection point is obtained, the control unit 300 defines the correction curve $Mcc_2(k)$ as in the following Equation (53). FIG. 25 is a diagram showing an example of the correction curve $Mcc_2(k)$ by a solid line.

$$M_{CC2}(k) = \begin{cases} k_1 < k < k_4 & L_1(k) \\ k_4 \le k \le k_5 & L_2(k) \\ k_5 < k < k_3 & L_3(k) \end{cases} \quad (53)$$

The correction curve $Mcc(k)$ is represented by the following Equation (54) using the correction curves $Mcc_1(k)$, $Mcc_2(k)$, and $Mcc_3(k)$ acquired by the above processing.

$$M_{CC}(k) = \begin{cases} k \le k_1 & -u_{hp}(k) \\ k_1 < k < k_4 & L_1(k) \\ k_4 \le k \le k_5 & L_2(k) \\ k_5 < k < k_3 & L_3(k) \\ k_3 \le k & -u_{hp}(k) \end{cases} \quad (54)$$

When the correction curve $Mcc(k)$ is obtained, the control unit 300 adds the correction curve $Mcc(k)$ to $u_{hp}(k)$ of the time-series data after the high-pass filter processing, thereby acquiring the time-series data $U(k)$ having the shape like the downwardly convex staircase function. The time-series data $U(k)$ is represented by the following Equation (55).

$$U(k) = \begin{cases} k \le k_1 & 0 \\ k_1 < k < k_4 & u_{hp}(k) + L_1(k) \\ k_4 \le k \le k_5 & u_{hp}(k) + L_2(k) \\ k_5 < k < k_3 & u_{hp}(k) + L_3(k) \\ k_3 \le k & 0 \end{cases} \quad (55)$$

Figure 26:
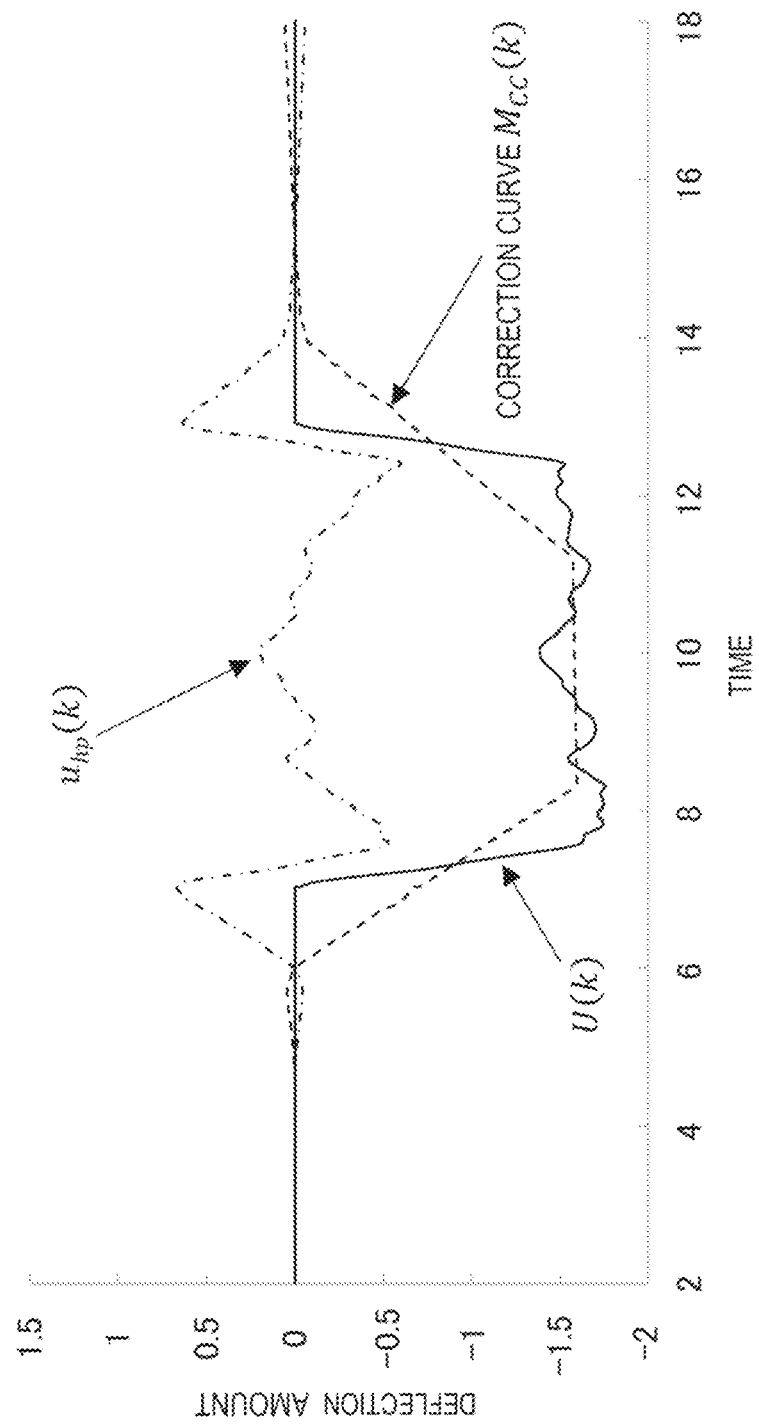
FIG. 26 is a diagram showing time-series data U(k) generated from the correction curve.

FIG. 26 is a diagram showing the time-series data after the high-pass filter processing by $u_{hp}(k)$, the correction curve $Mcc(k)$, and the time-series data $U(k)$ by a one-dot chain line, a dotted line, and a solid line, respectively. According to the above processing, the time-series data $U(k)$ after the drift noise and the vibration component are removed is acquired.

Therefore, with the function of the time point acquisition unit 303, the control unit 300 compares the time-series data $U(k)$ with the predetermined threshold $C_L$ related to the deflection amount, specifies two pieces of data between which the threshold $C_L$ is from $U(k)$, and performs processing of acquiring one piece of data k at the entry time point and the exit time point to obtain the values of the two pieces of k. Then, with the function of the time point acquisition unit 303, the control unit 300 acquires the smaller one of the obtained k as the data $k_i$ corresponding to the entry time point $t_i$ of the railway train 6 entering into the unit bridge girder. In addition, the control unit 300 acquires the larger one of the obtained k as the data $k_o$ corresponding to the exit time point $t_o$ of the railway train 6 exiting from the unit bridge girder.

In addition, the control unit 300 acquires $k_s$ corresponding to the passing period $t_s$ as $k_s = k_o - k_i$. Here as well, $t_s = k_s\Delta T$, $t_o = k_o\Delta T$, and $t_i = k_i\Delta T$. The threshold $C_L$ may be set so as to be able to specify that the deflection of the unit bridge girder is the deflection at the entry time point and the deflection at the exit time point. For example, the threshold $C_L$ can be defined by a value of a predetermined ratio (for example, 10%, 1%, or the like) of the maximum value of the deflection amount of the observation point of the unit bridge girder when the railway train passes through the unit bridge girder. According to the above processing, the control unit 300 can acquire the entry time point $t_i$ and the exit time point $t_o$ even if drift noise occurs.

When the entry time point $t_i$ and the exit time point to are acquired, the control unit 300 derives the passing period $t_s$ during which the railway train 6 passes through the unit bridge girder using Equation (1) based on $t_i$ and $t_o$. Then, the control unit 300 derives the wave number ν of the fundamental frequency $F_f$ included in the passing period is using Equation (33) based on the derived $t_s$ and the fundamental frequency $F_f$ derived based on u(k). Based on the derived ν, the control unit 300 derives the number N of railway vehicles included in the railway train 6 using Equation (34). When a method of a fourth embodiment is applied to the same time-series data u(k) as that of the above first embodiment, since $t_i$=7.09 [s], $t_o$=12.865 [s], $t_s$=5.775 [s], and $F_f$=3.01 [Hz], the control unit 300 acquires the number N of railway vehicles as round ((5.775)×3.01−1)=round (16.38)=16.

In the present embodiment, the time-series data U(k) including the second interval $Z_2$ is acquired in consideration of the fact that the time-series data U(k) after the drift noise and the vibration component are removed is useful in an evaluation of the displacement according to calculation, approximation, or the like of the deflection amount. However, if it is sufficient to acquire the entry time point $t_i$ and the exit time point $t_o$, the time-series data U(k) in the first interval $Z_1$ and the third interval $Z_3$ may be acquired, and the time-series data U(k) in the second interval $Z_2$ may not be acquired.

That is, the control unit 300 acquires the correction curve $Mcc_1(k)$ of the first interval and the correction curve $Mcc_3(k)$ of the third interval by the processing of Equation (37) to Equation (40). Further, the control unit 300 acquires the approximate curve as a first straight line $L_1(k)$ by Equation (41) to Equation (44) based on the correction curve $Mcc_1(k)$ of the first interval. In addition, the control unit 300 acquires the approximate curve as the third straight line $L_3(k)$ by Equation (45) to Equation (48) based on the correction curve $Mcc_3(k)$ of the third interval.

Then, the control unit 300 acquires a sum $U_1(k)$ of the time-series data $u_{hp}(k)$ on which the high-pass filter processing was performed and the first straight line $L_1(k)$ using Equation (56). In addition, the control unit 300 acquires a sum $U_3(k)$ of the time-series data $u_{hp}(k)$ on which the high-pass filter processing was performed and the third straight line $L_3(k)$ using Equation (57).

$$U_1(k) = \begin{cases} k \le k_1 & 0 \\ k_1 < k & u_{hp}(k) + L_1(k) \end{cases} \quad (56)$$

-continued $$U_3(k) = \begin{cases} k < k_3 & u_{hp}(k) + L_3(k) \\ k_3 \le k & 0 \end{cases} \quad (57)$$

Then, with the function of the time point acquisition unit 303, the control unit 300 executes processing of comparing the time-series data $U_1(k)$ with the predetermined threshold $C_L$ related to the deflection amount, specifying two pieces of data between which the threshold $C_L$ is from $U_1(k)$, and acquiring one of the two pieces of data k. The acquired k is data $k_i$ corresponding to the entry time point $t_i$ of the railway train 6 entering into the unit bridge girder. Further, with the function of the time point acquisition unit 303, the control unit 300 executes processing of comparing the time-series data $U_3(k)$ with the predetermined threshold $C_L$ related to the deflection amount, specifying two pieces of data between which the threshold $C_L$ is from $U_3(k)$, and acquiring one of the two pieces of data k. The acquired k is data $k_o$ corresponding to the exit time point $t_o$ of the railway train 6 exiting from the unit bridge girder. As a matter of course, as a method of specifying k, various methods can be adopted as in the above embodiment. Further, the control unit 300 acquires $k_s$ corresponding to the passing period is as $k_s = k_o - k_i$. In addition, the control unit 300 acquires the passing period $t_s$, the exit time point $t_o$, and the entry time point $t_i$ as $t_s = k_s \Delta T$, $t_o = k_o \Delta T$, and $t_i = k_i \Delta T$.

The predetermined threshold in the first embodiment and the second embodiment may vary depending on the unit bridge girder or the environment (weather or the like). Therefore, it may be determined in advance for each unit bridge girder or each environment. Since the threshold is used to determine the entry time point $t_i$ and the exit time point $t_o$, a plurality of thresholds can be provisionally set, and a value having the most appropriate values for the entry time point $t_i$ and the exit time point $t_o$ determined by the temporarily set thresholds can be used as the threshold.

Whether the entry time point $t_i$ and the exit time point $t_o$ are appropriate may be determined by various methods, and for example, it is possible to adopt a configuration in which a plurality of thresholds are temporarily set by the control unit 300, observation information is acquired based on the temporarily set thresholds, a time difference at a predetermined determination level between the deflection amount for each threshold acquired based on the observation information, the environment information, and an approximation equation of deflection and the time-series data is acquired, and a predetermined threshold is set based on a correlation between the acquired time difference and the plurality of temporarily set thresholds.

Figure 27:
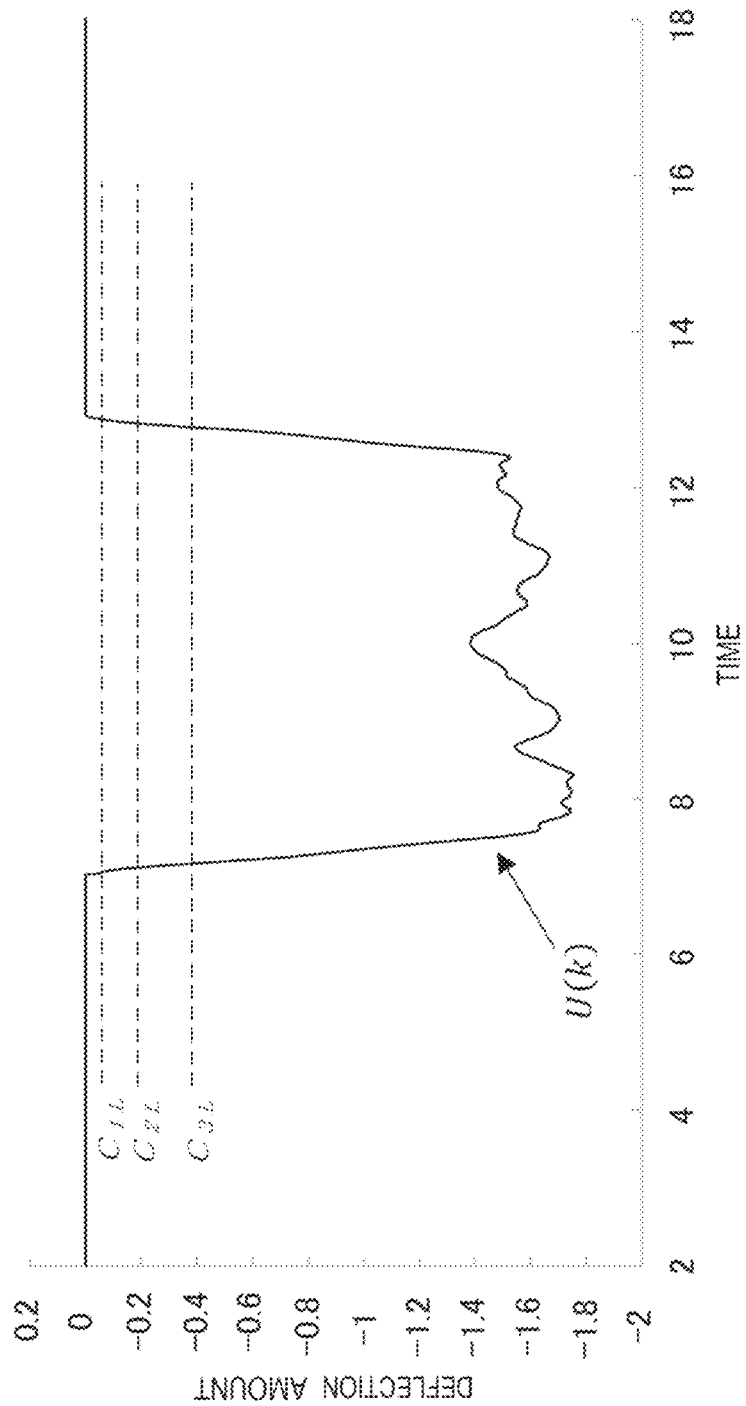
FIG. 27 is a diagram showing a plurality of temporarily set thresholds.

The predetermined threshold may be compared with either $u_{lp}(k)$ in Equation (37) in the first embodiment or $U(k)$ in Equation (55) in the second embodiment. FIG. 27 shows a state in which a plurality of thresholds $C_{1L}$, $C_{2L}$, and $C_{3L}$ are temporarily set for $U(k)$ in the second embodiment. Although a comparison with $U(k)$ will be mainly described below, it may be compared with $u_{lp}(k)$. When the plurality of thresholds $C_{1L}$, $C_{2L}$, and $C_{3L}$ are temporarily set, the control unit 300 can acquire a plurality of sets of the entry time point $t_i$ and the exit time point $t_o$ based on these thresholds. When the entry time point $t_i$ and the exit time point $t_o$ are acquired, the passing period is can be acquired, and the control unit 300 can acquire the fundamental frequency $F_t$ by performing the FFT processing on the time-series data u(k). The control unit 300 can acquire the number N of railway vehicles based on Equation (33) and Equation (34).

As described above, when the plurality of thresholds $C_{1L}$, $C_{2L}$, and $C_{3L}$ are temporarily set, a set of the entry time point $t_i$, the exit time point $t_o$, and the number N of the railway vehicles (a set of observation information) is obtained for each threshold. The control unit 300 associates each set of observation information with each threshold. Further, the control unit 300 acquires environmental information including the bridge length $L_B$ serving as the structure length, the vehicle length $L_C$ serving as the length of the moving object, and $L_a$ indicating the position of the axle of the railway vehicle. Then, the control unit 300 acquires a time change $T_{std}(k)$ of the deflection amount by executing a calculation for acquiring Equation (32) based on each set of observation information and the environmental information. The control unit 300 associates the time change in the deflection amount with each threshold. If the time change $T_{std}(k)$ of the deflection amount acquired in this way matches the time-series data $U(k)$, it can be said that the threshold is appropriate. Therefore, the control unit 300 evaluates a difference between the time-series data $U(k)$ and the time change $T_{std}(k)$ of the deflection amount acquired based on the plurality of temporarily set thresholds.

Since it is generally considered that scales of the time change $T_{std}(k)$ of the deflection amount and the time-series data $U(k)$ do not match, it is preferable to enlarge or reduce one of the scales to match the scales of two. For example, if it is assumed that the linear function obtained by multiplying the time change $T_{std}(k)$ of the deflection amount by the coefficient $c_1$ and adding a constant term $c_0$ is substantially equal to $U(k)$, it is possible to match the scales of the time change $T_{std}(k)$ of the deflection amount and the time-series data $U(k)$. The coefficient $c_1$ and the constant term $c_0$ can be calculated by a least squares method or the like. As a result, $U(k)$ and $T_{std}(k) \cdot c_1 + c_0$ are adjusted so as to have the most match. Here, the time change in the deflection amount after the adjustment is referred to as $T_{EOstd}(k)$.

Since this adjustment is determined based on a value in an interval from the entry time point $t_i$ to the exit time point $t_o$, the time change $T_{std}(k)$ of the deflection amount at a time point before the entry time point $t_i$ and at a time point after the exit time point $t_o$ may be regarded as another function. For example, at the time point before the entry time point $t_i$ and the time point after the exit time point $t_o$, the constant term $c_0$ is regarded as 0. In this case, the constant term $c_0$ may be changed according to an interval or a condition such that the deflection amount continues at the entry time point $t_i$ and the exit time point $t_o$.

In any case, according to the above processing, it is expected that the maximum value and the minimum value substantially match each other in both the time change $T_{EOstd}(k)$ of the deflection amount after adjustment and the time-series data $U(k)$, and that the time change $T_{EOstd}(k)$ and the time-series data $U(k)$ substantially overlap each other. The control unit 300 associates the time change in the deflection amount after the adjustment with each of the thresholds. Then, based on the temporarily set thresholds, the control unit 300 compares the time difference between the time change $T_{EOstd}(k)$ of the deflection amount after the adjustment and the time-series data $U(k)$, and acquires the threshold when the time difference is minimized, that is, when the time change $T_{EOstd}(k)$ and the time-series data $U(k)$ match most.

Figure 28:
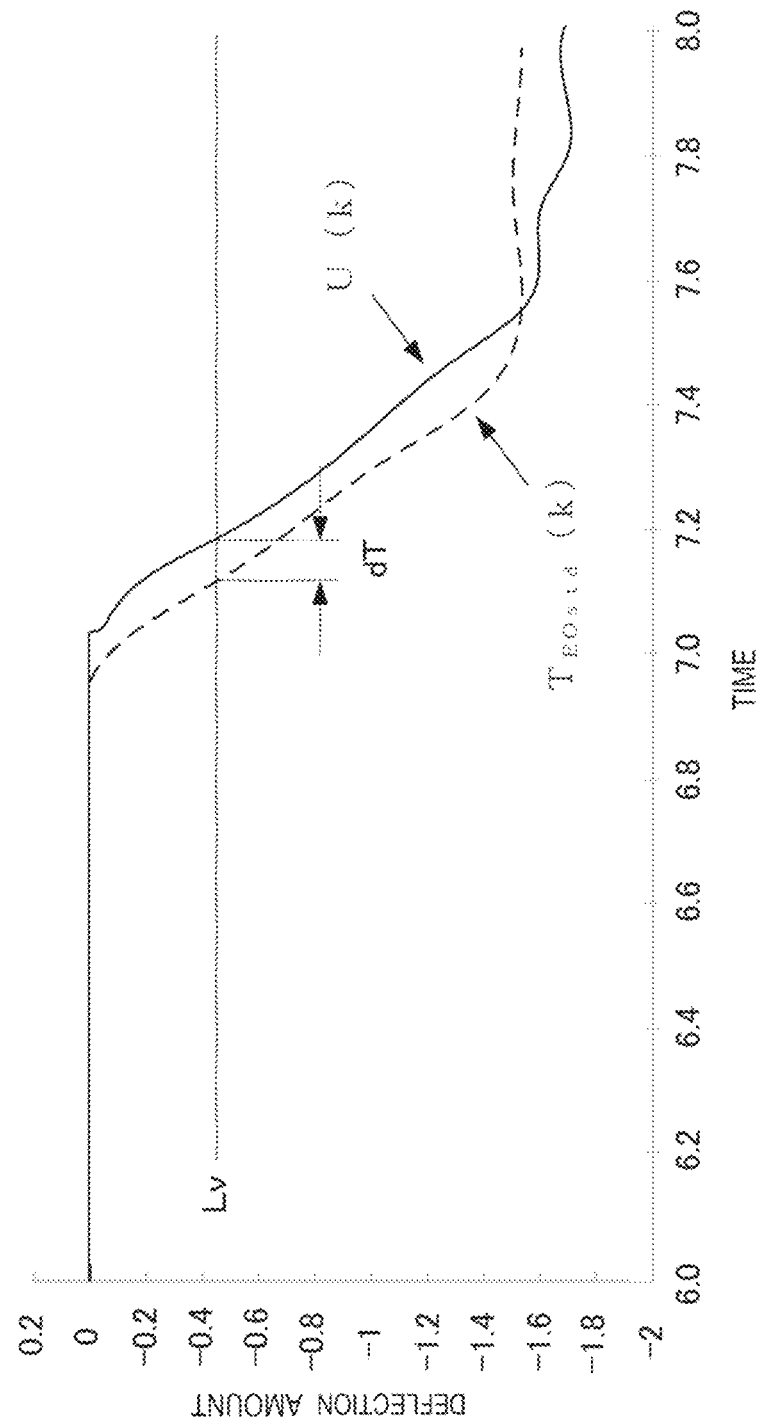
FIG. 28 is a diagram showing a time difference between the time-series data and a time change of a deflection amount obtained with the temporarily set threshold.

FIG. 28 is a partially enlarged view showing the time change $T_{EOstd}(k)$ of the deflection amount after the adjustment and the time-series data $U(k)$ by a dotted line and a solid line, respectively. In FIG. 28, the time change $T_{EOstd}(k)$ of the deflection amount after the adjustment corresponding to one threshold is selected as an example from a plurality of time changes $T_{EOstd}(k)$ of the deflection amount after the adjustment corresponding to a plurality of thresholds, and is indicated by a dotted line. As shown in FIG. 28, a time difference dT between the time change $T_{EOstd}(k)$ of the deflection amount after the adjustment and the time-series data U(k) may occur in an interval from the maximum value (deflection amount=0) to the minimum value (deflection amount=about −1.7) of the time change $T_{EOstd}(k)$ of the deflection amount after the adjustment. The control unit 300 acquires the time difference dT at a predetermined determination level Lv. That is, the control unit 300 acquires the time point at which the time change $T_{EOstd}(k)$ of the deflection amount after the adjustment and the time-series data U(k) become the predetermined determination level Lv, and acquires the difference between both time points as the time difference dT. The determination level Lv is a value determined in advance as a level at which a time difference may occur between the time change $T_{EOstd}(k)$ of the deflection amount and the time-series data U(k), and is a level determined from a range in which the deflection amount is less than 0 and greater than the minimum value. That is, the determination level Lv is set in advance so as to change from a state in which the deflection amount is equal to or greater than the determination level to a state in which the deflection amount is equal to or less than the determination level, and so as to change from a state in which the deflection amount is equal to or less than the determination level to a state in which the deflection amount is equal to or greater than the determination level. Since the time change $T_{EOstd}(k)$ of the deflection amount and the time-series data U(k) are discrete data on a time axis, the deflection amount and the time-series data U(k) are not necessarily the same as the determination level Lv, but when there is no data identical to the determination level Lv, a time point at which a value is closest to the determination level Lv may be specified, and the time difference dT may be acquired. The time difference dT is obtained for the time change $T_{EOstd}(k)$ obtained from each of the plurality of thresholds $C_{1L}$, $C_{2L}$, and $C_{3L}$. The acquired time difference dT is a time difference of the entry time point, and is referred to as a time difference dTi. Further, the control unit 300 also acquires the time difference dT at the determination level Lv at the exit time point. The acquired time difference dT is a time difference of the exit time point, and is referred to as a time difference dTo. The time difference may be evaluated by various indices, and a plurality of determination levels Lv may be set, or may be evaluated by an amount obtained by integrating a difference between the time change $T_{EOstd}(k)$ of the deflection amount after the adjustment and the time-series data U(k), or the like. Further, a sum of an absolute value of the time difference dTi and an absolute value of the time difference dTo may be measured for each of the plurality of thresholds, and a threshold at which the sum is minimized may be acquired based on the correlation between the sum and the threshold.

Figure 29:
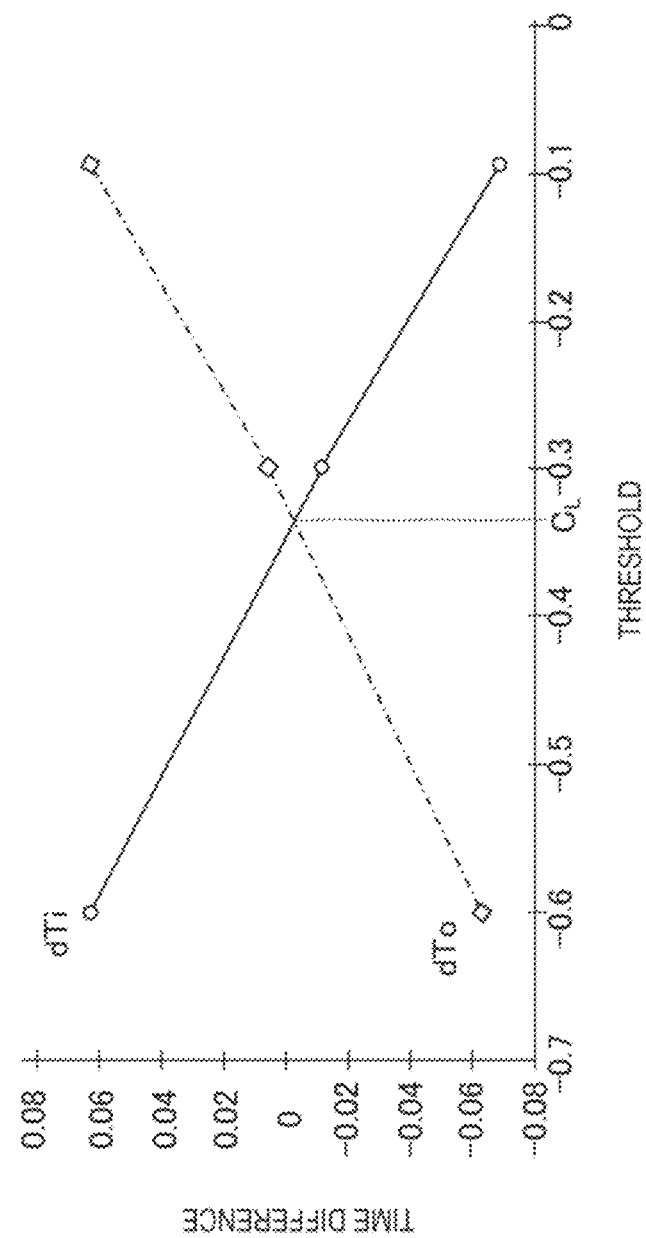
FIG. 29 is a diagram showing a method of calculating a threshold.

The control unit 300 acquires a predetermined threshold based on the time difference dTi at the entry time point and the time difference dTo at the exit time point acquired based on the plurality of thresholds. FIG. 29 shows an example of processing of acquiring the predetermined threshold. In FIG. 29, a horizontal axis represents the temporarily set threshold, and a vertical axis represents the time difference. In FIG. 29, a solid line indicates the time difference dTi at the entry time point, and a dashed-dotted line indicates the time difference dTo at the exit time point. The control unit 300 regards a straight line coupling the time differences dTi at the entry time point acquired by the plurality of temporarily set thresholds as indicating a correlation between the threshold and the time differences dTi at the entry time point. In addition, the control unit 300 regards a straight line coupling the time differences dTo at the exit time point acquired by the plurality of temporarily set thresholds as indicating a correlation between the threshold and the time difference dTo at the exit time point. Then, the control unit 300 acquires a threshold (intersection point of the straight lines in FIG. 29) at which the time difference dTi (absolute value) at the entry time point and the time difference dTo (absolute value) at the exit time point are minimized, and sets the threshold as the predetermined threshold $C_L$. According to the above processing, it is possible to optimize the threshold in accordance with the bridge and the environment.

(3-2) Third Embodiment

Further, the entry time point $t_i$ and the exit time point $t_o$ are not limited to a configuration in which the entry time point $t_i$ and the exit time point $t_o$ are determined based on a comparison between the time-series data $u_{lp}(k)$ from which the vibration component was removed and the predetermined threshold $C_L$. For example, with the time point acquisition unit 303 shown in FIG. 13, the control unit 300 may differentiate the time-series data $u_{lp}(k)$ on which the low-pass filter processing is performed, and acquire the entry time point $t_i$ and the exit time point $t_o$ based on a waveform of the differentiated time-series data $u_{lp}(k)$.

Figure 30:
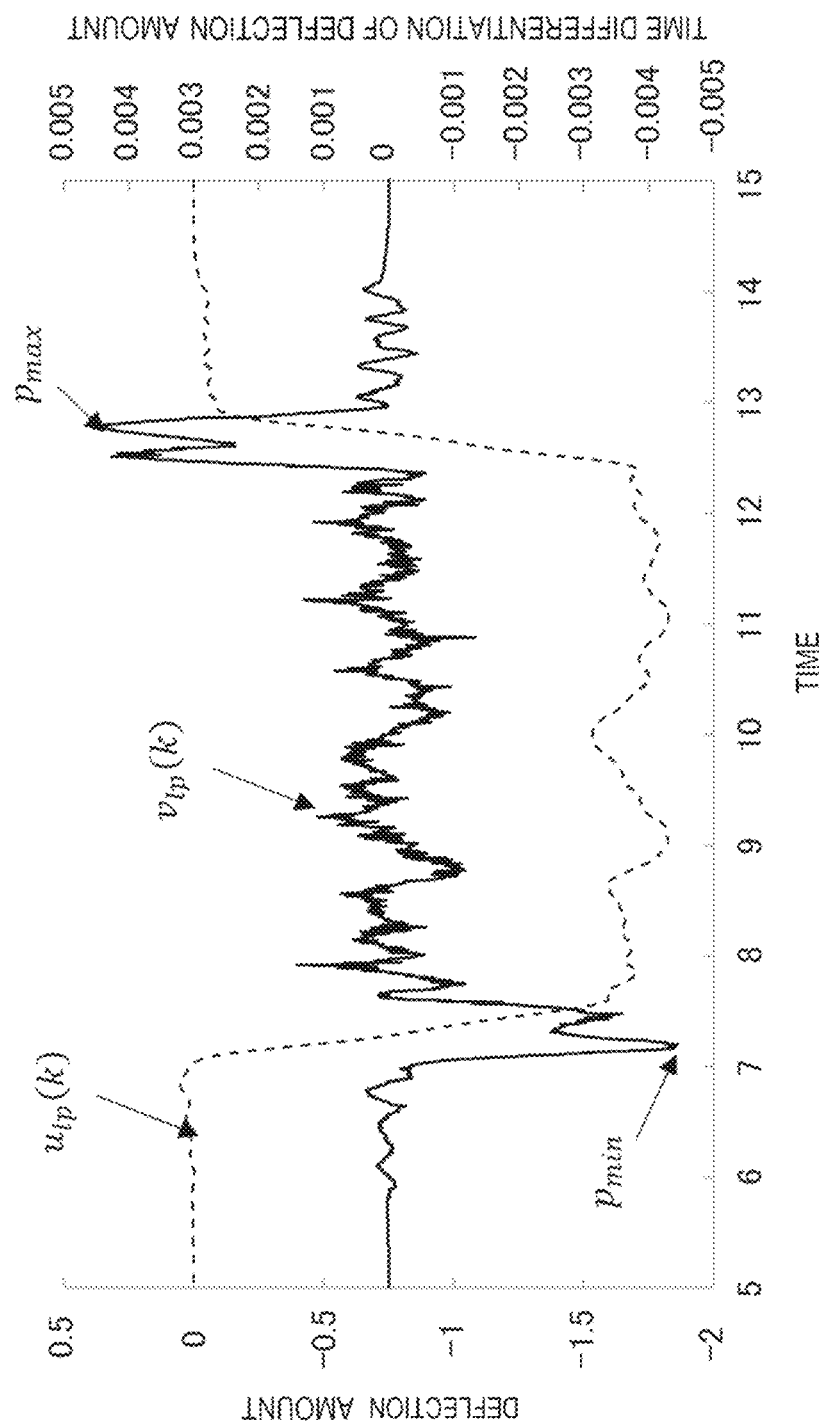
FIG. 30 is a diagram showing an example of time differentiation of the time-series data.
Figure 31:
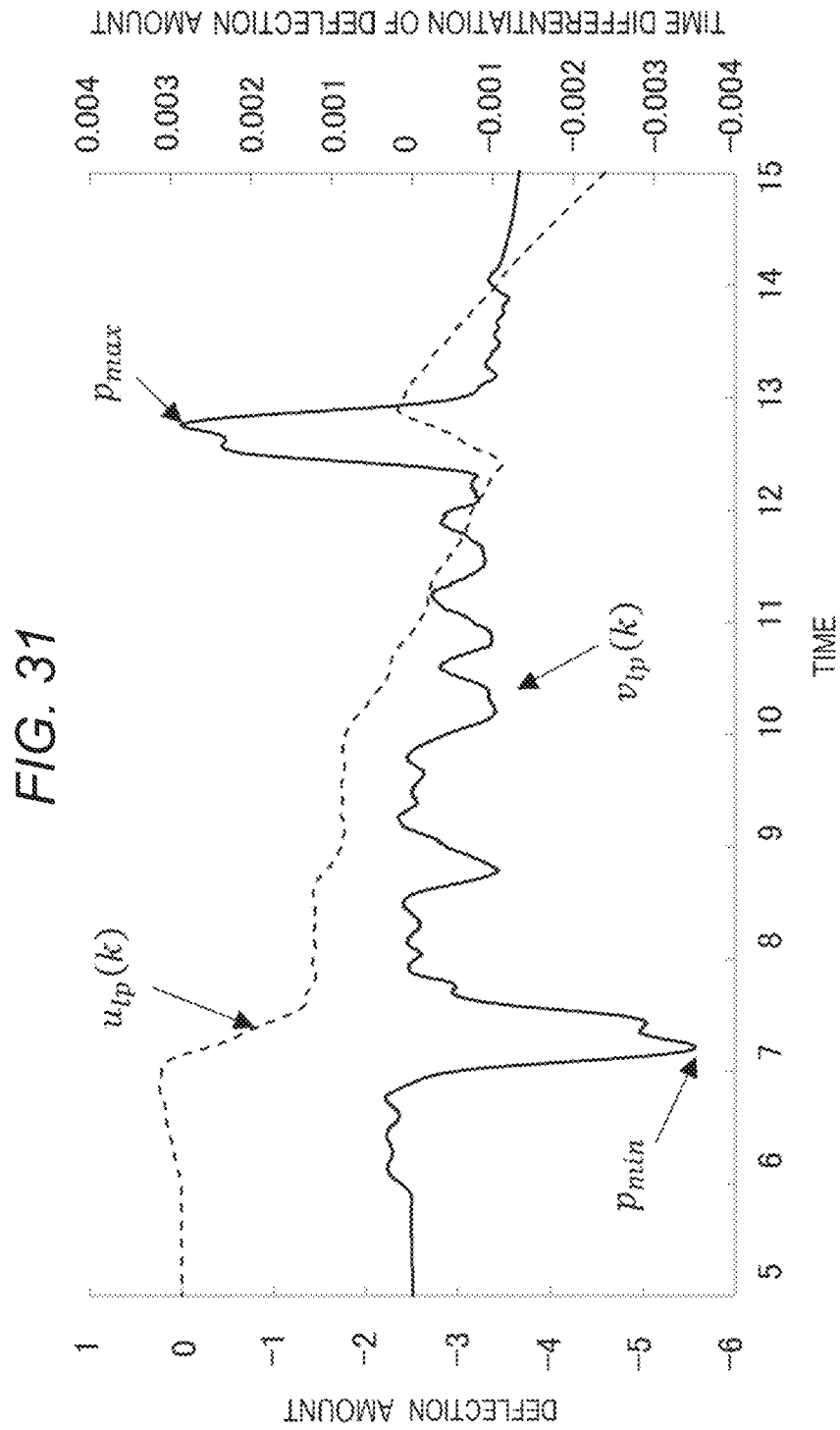
FIG. 31 is a diagram showing an example of the time differentiation of the time-series data.

That is, as shown in FIG. 16, the entry time point $t_i$ and the exit time point $t_o$ exist in slope portions of the time-series data $u_{lp}(k)$ on which the low-pass filter processing was performed. Since $u_{lp}(k)$ is substantially constant or a rate of change is slow before and after the slope portion, when the differential is calculated, the slope portion should be convex downward or convex upward, and the portion other than the slope should be substantially flat. FIG. 30 shows the time-series data $u_{lp}(k)$ when there is no drift noise and a time differentiation $v_{lp}(k)$ thereof. FIG. 31 shows the time-series data $u_{lp}(k)$ when there is no drift noise and the time differentiation $v_{lp}(k)$ thereof. In both diagrams, a horizontal axis represents time, a vertical axis represents the deflection amount, the time-series data $u_{lp}(k)$ is indicated by a dotted line, and the time differentiation $v_{lp}(k)$ is indicated by a solid line.

The time differentiation may be acquired by various methods, and the control unit 300 acquires the time differentiation by, for example, a difference method shown in Equation (58). In order to acquire the entry time point $t_i$ and the exit time point $t_o$, it is preferable that the time-differentiated time-series data is smoothed, and in the present embodiment, the control unit 300 performs smoothing as represented by Equation (59) using the moving average in an average interval $k_a$. The time differentiation $v_{lp}(k)$ in FIGS. 30 and 31 is time-series data after smoothing. The smoothing may be omitted depending on a waveform after the time differentiation.

$$v(k) = \frac{u_{lp}(k) - u_{lp}(k-1)}{\Delta T} \tag{58}$$

$$v_{lp}(k) = \frac{1}{k_a} \sum_{n=k-\frac{k_a}{2}}^{k+\frac{k_a}{2}} v(n) \tag{59}$$

As shown in FIGS. 30 and 31, the time differentiation of the slope portion at which the entry time point $t_i$ exists has a negative peak (downwardly convex peak), and the time differentiation of the slope portion at which the exit time point $t_o$ exists has a positive peak (upwardly convex peak). As shown in FIGS. 30 and 31, each peak is separated into two peaks. It is considered that the occurrence of the separation of these peaks is caused by the fact that two axles of the railway vehicle exist near the front end and two axles of the railway vehicle exist near the rear end. That is, when the wheel enters the unit bridge girder, there is a large influence on the displacement of the unit bridge girder, so that the two axles near the front end enter the unit bridge girder to form an early stage of the slope, and the two axles near the rear end enter the unit bridge girder to change a tendency of the displacement.

Since it is considered that the peaks are separated due to these influences, in the present embodiment, in a case in which the peaks of the differentiated time-series data $v_{lp}(k)$ are separated, when the time point to be acquired is the entry time point $t_i$, the control unit 300 acquires, as the entry time point $t_i$, the time point of the peak corresponding to the earlier time point among the separated negative peaks. On the other hand, in a case in which the peaks of the differentiated time-series data $v_{lp}(k)$ are separated, when the time point to be acquired is the exit time point $t_o$, the control unit 300 acquires, as the exit time point $t_o$, the time point of the peak corresponding to the later time point among the separated positive peaks.

Specifically, the control unit 300 specifies coordinates $(k_{min}, v_{min})$ of a minimum value $p_{min}$ and coordinates $(k_{max}, v_{max})$ of a maximum value $p_{max}$ based on the time differentiation $v_{lp}(k)$. Then, with the function of the time point acquisition unit 303, the control unit 300 acquires data $k_{min}$ having the minimum value $p_{min}$ as the data $k_i$ corresponding to the entry time point $t_i$ of the railway train 6 entering into the unit bridge girder. In addition, the control unit 300 acquires data $k_{max}$ having the maximum value $p_{max}$ as the data $k_o$ corresponding to the exit time point $t_o$ of the railway train exiting from the unit bridge girder. In addition, the control unit 300 acquires $k_s$ corresponding to the passing period is as $k_s = k_o - k_i$.

When the above processing is performed, the number acquisition unit 304 has a function of acquiring the number of railway vehicles included in the railway train 6 based on $u(k)$ which is the time-series data acquired by the function of the data acquisition unit 301, and the entry time point $t_i$ and the exit time point $t_o$ acquired by the function of the time point acquisition unit 303. That is, based on $t_i$ and $t_o$, the control unit 300 derives the passing period $t_s$ during which the railway train 6 passes through the unit bridge girder using Equation (1). Then, the control unit 300 derives the wave number $v$ of the fundamental frequency $F_f$ included in the passing period is using Equation (33) based on the derived $t_s$ and the fundamental frequency $F_f$ derived based on $u(k)$. Based on the derived $v$, the control unit 300 derives the number N of railway vehicles included in the railway train 6 using Equation (34). When the method of the second embodiment is applied to the same time-series data $u(k)$ as that of the first embodiment, since $t_i=7.21$ [s], $t_o=12.76$ [s], $t_s=5.55$ [s], and $F_f=3.01$ [Hz], the control unit 300 acquires the number N of railway vehicles as round $((5.55)\times 3.01-1)$ =round $(15.71)=16$. According to the above configuration, the entry time point $t_i$ and the exit time point $t_o$ can be acquired regardless of the presence or absence of drift noise.

(3-3) Fourth Embodiment

The configuration of acquiring the entry time point $t_i$ and the exit time point $t_o$ based on the feature of the shape of the time-series data $u_{lp}(k)$ is not limited to the third embodiment. For example, the control unit 300 may cause the time point acquisition unit 303 shown in FIG. 13 to perform high-pass filter processing for attenuating a frequency band lower than the fundamental frequency on the time-series data $u_{lp}(k)$ on which the low-pass filter processing was performed, acquire a first peak as the entry time point $t_i$ based on the waveform of the time-series data on which the high-pass filter processing was performed, and acquire a last peak as the exit time point $t_o$. Here, the fundamental frequency corresponds to a peak having the lowest corresponding frequency among peaks of natural resonance (natural frequency of the unit bridge girder) indicated by a result of Fourier transform on the time-series data $u_{lp}(k)$.

The high-pass filter processing may be performed by various methods, and in the present embodiment, the high-pass filter processing is performed by the time-series data $u(k)$ to the time-series data $u_{lp}(k)$. However, the high-pass filter processing may be various kinds of processing, and the high-pass filter processing may be performed by an FIR high-pass filter or the like having a cutoff frequency lower than the fundamental frequency.

The time-series data $u_{hp}(k)$ on which the high-pass filter processing was performed has a waveform as shown in FIG. 21, for example. In a fourth embodiment, with the function of the time point acquisition unit 303, the control unit 300 specifies coordinates $(k_1, u_1)$ of the positive peak (upwardly convex peak) $P_1$ and coordinates $(k_3, u_3)$ of the peak $P_3$ in the time-series data $u_{hp}(k)$ on which the high-pass filter processing was performed. Then, with the function of the time point acquisition unit 303, the control unit 300 acquires the data $k_i$ at the coordinates of the first peak $P_1$ as the data $k_i$ corresponding to the entry time point $t_i$ of the railway train 6 entering into the unit bridge girder. In addition, the control unit 300 acquires the data $k_3$ at the coordinates of the last peak $P_3$ as the data $k_o$ corresponding to the exit time point $t_o$ of the railway train 6 exiting from the unit bridge girder. In addition, the control unit 300 acquires $k_s$ corresponding to the passing period is as $k_s = k_o - k_i$. The peak may be specified by various methods. For example, data in which the deflection amount is equal to or greater than a predetermined value may be used as the peak, data in two upper places in which the deflection amount is large may be used as the peak, and various configurations may be adopted.

When the above processing is performed, the number acquisition unit 304 has a function of acquiring the number of railway vehicles included in the railway train 6 based on $u(k)$ which is the time-series data acquired by the function of the data acquisition unit 301, and the entry time point $t_i$ and the exit time point $t_o$ acquired by the function of the time point acquisition unit 303. That is, based on $t_i$ and $t_o$, the control unit 300 derives the passing period $t_s$ during which the railway train 6 passes through the unit bridge girder using Equation (1). Then, the control unit 300 derives the wave number $v$ of the fundamental frequency $F_f$ included in the passing period is using Equation (33) based on the derived $t_s$ and the fundamental frequency $F_f$ derived based on $u(k)$. Based on the derived $v$, the control unit 300 derives the number N of railway vehicles included in the railway train 6 using Equation (34).

When the method of the third embodiment is applied to the same time-series data $u(k)$ as that of the first embodiment, since $t_i=7.035$ [s], $t_o=12.92$ [s], $t_s=5.885$ [s], and $F_f=3.01$ [Hz], the control unit 300 acquires the number N of railway vehicles as round $((5.885)\times 3.01-1)$=round $(16.71)=17$.

The time-series data $u_{hp}(k)$ shown in FIG. 21 is data generated based on the time-series data $u_{lp}(k)$ including drift noise as shown in FIG. 20. However, the waveform indicated by the time-series data $u_{hp}(k)$ is not influenced by drift noise. Therefore, according to the present embodiment, the entry time point $t_i$ and the exit time point $t_o$ can be easily acquired even for the time-series data $u(k)$ including drift noise.

In the present embodiment, the high-pass filter processing is attained by subtracting the time-series data $u_{lp}(k)$ from the time-series data $u(k)$. Since the time-series data $u_{lp}(k)$ is obtained by Equation (37) as described above, the time-series data $u_{lp}(k)$ is time-series data obtained by performing moving average in a cycle of a natural number multiple (one time) of the basic cycle $T_f$ obtained from the fundamental frequency $F_f$ of the time-series data $u(k)$. Therefore, the high-pass filter processing is processing of subtracting the time-series data $u_{lp}(k)$ obtained by performing moving average in the cycle of the natural number multiple of the basic cycle from the time-series data $u(k)$ before the moving average.

Figure 32:
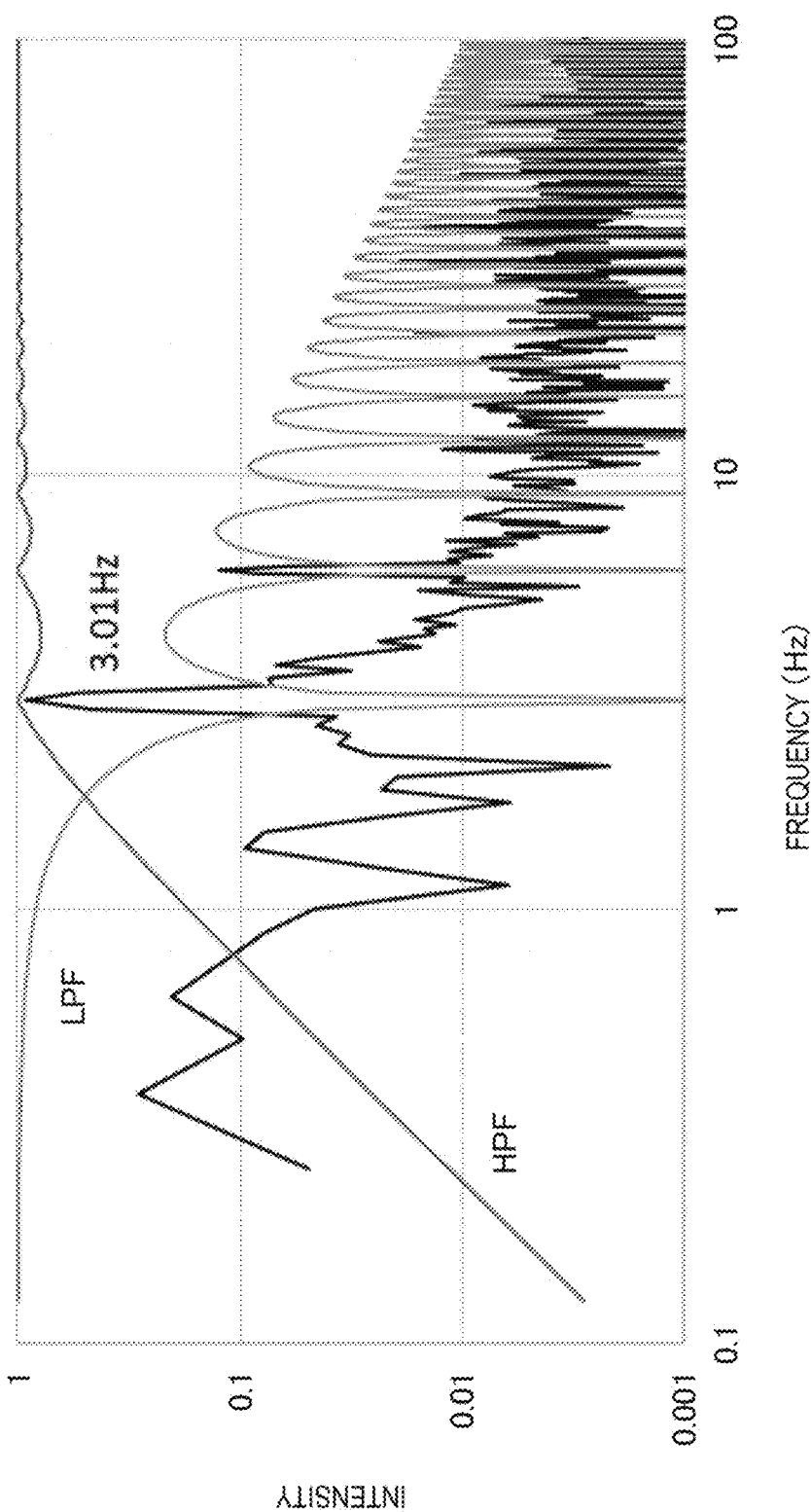
FIG. 32 is a diagram showing gain frequency characteristics.

FIG. 32 shows gain frequency characteristics of the time-series data $u_{lp}(k)$ and the time-series data $u_{hp}(k)$ obtained by such a moving average. In FIG. 32, a horizontal axis represents a frequency, and a vertical axis represents gain. In FIG. 32, the gain frequency characteristic of the time-series data $u_{lp}(k)$ after the low-pass filter processing is indicated by gray with an LPF added thereto, and the gain frequency characteristic of the time-series data $u_{hp}(k)$ after the high-pass filter processing is indicated by gray with an HPF added thereto. In addition, a frequency characteristic (intensity after the FFT) of the time-series data $u(k)$ are also shown in black.

As shown in FIG. 32, the gain frequency characteristic of the time-series data $u_{lp}(k)$ after the low-pass filter processing gradually decreases from gain 1 as the frequency increases in an interval of 3.01 Hz or less of the fundamental frequency $F_t$. At a frequency equal to or higher than the fundamental frequency $F_t$, the minimum value becomes 0 at a frequency that is a natural number multiple of the fundamental frequency, and a characteristic in which the gain increases between frequencies that are natural number multiple of the fundamental frequency is repeated. As the frequency increases, the gain gradually decreases as a tendency. As a result, the low-pass filter mainly attenuates data of a frequency equal to or higher than the fundamental frequency $F_t$.

The high-pass filter processing according to the present embodiment is processing of subtracting the time-series data $u_{lp}(k)$ after the low-pass filter processing from the time-series data $u(k)$ before the low-pass filter processing. Therefore, the time-series data $u_{hp}(k)$ after the high-pass filter processing also has a characteristic reflecting the gain frequency characteristic of the low-pass filter processing.

That is, as shown in FIG. 32, the gain frequency characteristic of the time-series data $u_{hp}(k)$ after the high-pass filter processing gradually increases as the frequency increases in an interval of the fundamental frequency $F_t$ equal to or less than 3.01 Hz. When the frequency is equal to or higher than the fundamental frequency $F_t$, the maximum value becomes 1 at a frequency that is a natural number multiple of the fundamental frequency, and a characteristic in which the gain decreases between frequencies that are natural number multiple of the fundamental frequency is repeated. A reduction width of the gain gradually decreases, and the gain approaches 1 as the gain increases toward the high frequency side. As a result, data of a frequency that is equal to or lower than the fundamental frequency $F_t$ is mainly attenuated.

As described above, the high-pass filter processing according to the present embodiment has a maximum value of 1 at frequencies that are equal to or higher than the fundamental frequency $F_t$ and are the natural number multiple of the fundamental frequency. Therefore, according to the present embodiment, the high-pass filter processing can be performed without impairing the vibration component that is included in the observed time-series data $u(k)$ and that is induced by the railway vehicle and a harmonic of the vibration component. As a result, in the time-series data $u_{hp}(k)$ after the high-pass filter processing, it is possible to analyze a waveform of a state including the vibration component due to the passage of the railway vehicle, and it is possible to increase the possibility that the entry time point $t_i$ and the exit time point $t_o$ can be accurately acquired.

(4) Other Embodiments

The above embodiments are examples for carrying out the present disclosure, and various other embodiments can be adopted. The method of acquiring the entry time point of the railway train entering into the structure and the exit time point of the railway train exiting from the structure from the displacement at the observation point as in the above embodiment can also be realized as an invention of a program or an invention of a method.

Further, a configuration in which the function of the server device 3 is implemented by a plurality of devices may be adopted. In addition, the functions of the server device 3 may be implemented in another device. For example, the functions of the data acquisition unit 301, the removal unit 302, the time point acquisition unit 303, and the number acquisition unit 304 may be implemented by the measurement device 1. Further, the above embodiments are examples, and an embodiment in which a part of the configuration is omitted or another configuration is added may be adopted.

In the above embodiment, the time point acquisition system 10 acquires the time points at which the railway train formed with the railway vehicles, which are one or more moving objects, enters the unit bridge girder serving as the structure and exits from the unit bridge girder. The formation moving object may be a moving object formed with one or more moving objects, and the number of moving objects may be one or more. Therefore, the time point acquisition system 10 may acquire an entry time point and an exit time point of a formation moving object other than the railway train. For example, the time point acquisition system 10 may acquire an entry time point and an exit time point of a formation truck in which one or more trucks are coupled. The time point acquisition system 10 may acquire an entry time point and an exit time point of a vehicle included in a trailer in which one or more vehicles are coupled.

The observation point may be at any position as long as the response of the structure can be observed, and is not limited to a center position of the structure. The physical quantity may be a response caused by the movement of the formation moving object on the structure, and when the structure is influenced by the movement of the formation moving object or a weight of the formation moving object, the change is a response when the structure is changed as compared with a case where the structure is not influenced. Therefore, the structure is not limited to the unit bridge girder, and the response is not limited to an acceleration of the structure. For example, the time point acquisition system 10 may acquire an entry time point and an exit time point of a formation moving object that moves on a structure different from a bridge, such as a concrete base that supports a railroad track. In the above embodiment, the number of sensor devices 2 included in the time point acquisition system 10 is two, but the number may be one or three or more.

In the above embodiment, the control unit 300 acquires, as the time-series data u(k), the data of displacement (deflection) measured from the acceleration detected via the acceleration sensor 210. However, the control unit 300 may acquire, as u(k), displacement data of the unit bridge girder derived from a physical quantity detected via a sensor such as an impact sensor, a pressure-sensitive sensor, a strain gauge, an image measuring device, a load cell, or a displacement gauge. For example, the control unit 300 may detect the displacement of the observation point and acquire the detected displacement data by the image measuring device capturing an image of a predetermined object in a cycle, the predetermined object being disposed at the observation point of the bridge 5. The physical quantity is obtained by actually measuring a change occurring at the observation point of the structure, and may be used for specifying a value to be observed with respect to the formation moving object. Therefore, the physical quantity may be various quantities, and the control unit 300 may acquire data of a physical quantity different from the displacement of the unit bridge girder as u(k). For example, the control unit 300 may acquire, as u(k), an acceleration, a speed, a stress, and the like at the observation point of the bridge 5. Further, the control unit 300 may acquire, as u(k), the number of pixels corresponding to the displacement amount of the predetermined object disposed at the observation point of the bridge 5 in the image captured via the image measuring device. In addition, the control unit 300 may acquire data of a plurality of types of physical quantities (for example, displacement, stress, and the like) generated at the observation point as a response caused by the movement of the railway train 6 on the unit bridge girder.

The vibration component included in the time-series data is a response other than the response caused by the entry of the formation moving object entering into the structure and the exit of the formation moving object exiting from the structure. Therefore, when the formation moving object is constituted by a plurality of moving objects, the vibration component corresponds to a vibration component or the like generated in the structure by the moving object, which is between the foremost moving object and the rearmost moving object, moving on the structure and exiting from the structure. The method for removing the vibration component is not limited to the above-described low-pass filter processing, and various methods may be adopted. For example, processing in which a displacement corresponding to any k is regarded as a statistical value (a minimum value, a maximum value, or a median value) of a specific range including this k may be performed. A low-pass filter circuit may be included in the circuit that acquires the time-series data u(k), and various other configurations may be adopted.

The entry time point is a time point at which the formation moving object enters the structure. Therefore, typically, the entry time point is a time point at which a contact point (wheel) between the foremost moving object of the formation moving object and the structure reaches the structure, but the entry time point may be another definition, for example, a time point at which a tip of the formation moving object reaches the structure from the outside of the structure, or the like. The same applies to the exit time point. The exit time point may be a time point at which a contact point (wheel) between the rearmost moving object of the formation moving object and the structure moves from the structure to the outside of the structure, or the like.

Further, in the above embodiment, the control unit 300 specifies the peak corresponding to the lowest frequency, except for the side lobe generated due to the influence of the window function used in the FFT, from the result of the FFT on the time-series data u(k) acquired by the function of the data acquisition unit 301, and obtains the specified peak as the fundamental frequency $F_f$. However, in consideration of an influence of a noise generated in the result of the FFT on u(k), the control unit 300 may obtain the fundamental frequency $F_f$. For example, the control unit 300 may specify a peak equal to or greater than a predetermined threshold corresponding to the lowest frequency, except for the side lobe generated due to the influence of the window function used in the FFT, from the result of the FFT on u(k), and obtain the specified peak as the fundamental frequency $F_f$. The time-series data may be data acquired at a data rate of twice or more the frequency of vibration assumed to occur in the structure due to the movement of the formation moving object.

Further, the present disclosure can also be applied as a program executed by a computer or a method. In addition, the program and method as described above may be implemented as a single device or may be implemented by using components included in a plurality of devices, and includes various aspects. In addition, it is possible to appropriately change the configuration such that a part of the configuration is software and a part of the configuration is hardware. Further, the present disclosure is also applicable to a recording medium of a program. As a matter of course, the recording medium of the program may be a magnetic recording medium, a semiconductor memory, or the like, and any recording medium to be developed in the future can be considered in the same manner.

What is claimed is:

1. A time point acquisition method for causing a processor to execute a program stored in a memory, the time point acquisition method comprising executing on the processor the steps of:
   continuously acquiring acceleration data detected by acceleration sensors, the acceleration sensors being installed at different positions along a superstructure of a bridge, the acceleration data corresponding to movement of a plurality of vehicles at the different positions as the plurality of vehicles move on the superstructure along with a formation moving vehicle;
   acquiring time-series data indicating a time change of a displacement of the superstructure based on the continuously acquired acceleration data;
   removing a vibration component included in the time-series data;
   identifying first data and second data of the time-series data, the first and second data sandwiching a threshold value, the threshold value corresponding to a deflection value generated by a front part of the formation moving vehicle entering onto the superstructure; and
   acquiring an entry time point at which the formation moving vehicle enters the superstructure and an exit time point at which the formation moving vehicle exits from the superstructure based on the first and second data after the vibration component is removed therefrom.

2. The time point acquisition method according to claim 1, wherein
 the vibration component is removed by performing low-pass filter processing on the time-series data, and
 the entry time point and the exit time point are acquired by performing, for each of the entry time point and the exit time point, processing of acquiring a time point within a period after one time point and before another time point of two time points corresponding to two consecutive pieces of data between which a predetermined threshold is, the two consecutive pieces of data being included in the time-series data on which the low-pass filter processing is performed.

3. The time point acquisition method according to claim 1, wherein
 the vibration component is removed by performing low-pass filter processing on the time-series data,
 high-pass filter processing is performed on the time-series data on which the low-pass filter processing was performed,
 a first peak and a second peak of the time-series data on which the high-pass filter processing was performed are acquired, and a first interval before the first peak, a second interval between the first peak and the second peak, and a third interval after the second peak are acquired,
 in the first interval, a correction curve of the first interval is acquired by inverting a sign of the time-series data on which the high-pass filter processing was performed,
 in the second interval,
 in an interval less than a product of a first coefficient and a value obtained by inverting a sign of an amplitude of the first peak, a first straight line which is an approximate straight line of a correction curve of the first interval is acquired,
 a second straight line which is a straight line obtained by multiplying a straight line passing through the first peak and the second peak by a second coefficient is acquired,
 in an interval less than a product of a third coefficient and a value obtained by inverting a sign of an amplitude of the second peak, a third straight line which is an approximate straight line of a correction curve of the third interval is acquired,
 a first intersection point, which is an intersection point of the first straight line and the second straight line, and a second intersection point, which is an intersection point of the second straight line and the third straight line, are acquired,
 in the second interval, a correction curve of the second interval is acquired by setting a portion before the first intersection point as the first straight line, setting a portion from the first intersection point to the second intersection point as the second straight line, and setting a portion after the second intersection point as the third straight line,
 in the third interval, a correction curve of the third interval is acquired by inverting a sign of the time-series data on which the high-pass filter processing was performed,
 correction data is acquired by adding the correction curve of the first interval, the correction curve of the second interval, and the correction curve of the third interval, and
 the entry time point and the exit time point are acquired by performing, for each of the entry time point and the exit time point, processing of acquiring a time point within a period after one time point and before another time point of two time points corresponding to two consecutive pieces of data between which a predetermined threshold is, the two consecutive pieces of data being included in a sum of the time-series data on which the high-pass filter processing was performed and the correction data.

4. The time point acquisition method according to claim 1, wherein
 the vibration component is removed by performing low-pass filter processing on the time-series data,
 high-pass filter processing is performed on the time-series data on which the low-pass filter processing was performed,
 a first peak and a second peak of the time-series data on which the high-pass filter processing was performed are acquired, and a first interval before the first peak, a second interval between the first peak and the second peak, and a third interval after the second peak are acquired,
 in the first interval, a correction curve of the first interval is acquired by inverting a sign of the time-series data on which the high-pass filter processing was performed,
 in an interval less than a product of a first coefficient and a value obtained by inverting a sign of an amplitude of the first peak, a first straight line which is an approximate straight line of a correction curve of the first interval is acquired,
 in the third interval, a correction curve of the third interval is acquired by inverting a sign of the time-series data on which the high-pass filter processing was performed,
 in an interval less than a product of a third coefficient and a value obtained by inverting a sign of an amplitude of the second peak, a third straight line which is an approximate straight line of a correction curve of the third interval is acquired,
 a time point within a period after one time point and before another time point of two time points corresponding to two consecutive pieces of data between which a predetermined threshold is present is acquired as the entry time point, the two consecutive pieces of data being included in a sum of the time-series data on which the high-pass filter processing was performed and the first straight line, and
 a time point within a period after one time point and before the other time point of two time points corresponding to two consecutive pieces of data between which a predetermined threshold is present is acquired as the exit time point, the two consecutive pieces of data being included in a sum of the time-series data on which the high-pass filter processing was performed and the third straight line.

5. The time point acquisition method according to claim 2, wherein
 from the time-series data acquired as a response caused by the movement of the known formation moving vehicle on the superstructure and a plurality of temporarily set thresholds, observation information including the entry time point, the exit time point, and the number of the plurality of moving vehicles is acquired in association with each of the plurality of temporarily set thresholds,
 environmental information including a structure length which is a length of the superstructure, a moving vehicle length which is a length of one of the plurality of moving vehicles, and an installation position of a contact portion of one of the plurality of moving vehicles with the superstructure is acquired,
 a time change of a deflection amount in each of the thresholds temporarily set based on an approximate equation of the observation information, the environmental information, and deflection is acquired, a time difference in a predetermined determination level between each of the acquired deflection amounts and the time-series data is acquired, and the threshold having a smallest time difference is acquired based on a correlation between the acquired time difference and the plurality of temporarily set thresholds, and is set as the predetermined threshold.

6. The time point acquisition method according to claim 5, wherein the deflection amount of each of the thresholds is derived by an equation indicating a model of deflection specified based on an architecture of the superstructure.

7. The time point acquisition method according to claim 1, wherein the vibration component is removed by performing low-pass filter processing on the time-series data, and the time-series data on which the low-pass filter processing was performed is differentiated, and based on a waveform of the differentiated time-series data, a negative peak and a positive peak are acquired, the negative peak is acquired as the entry time point, and the positive peak is acquired as the exit time point.

8. The time point acquisition method according to claim 7, wherein when the negative peak and the positive peak of the differentiated time-series data are separated from each other, a time point of a peak corresponding to an earlier time point in the negative peak is acquired as the entry time point, and a time point of a peak corresponding to a later time point in the positive peak is acquired as the exit time point.

9. The time point acquisition method according to claim 1, wherein the vibration component is removed by performing low-pass filter processing on the time-series data, and the time-series data on which the low-pass filter processing was performed is subjected to high-pass filter processing for attenuating a frequency band lower than a fundamental frequency, and based on a waveform of the time-series data on which the high-pass filter processing was performed, a first peak is acquired as the entry time point and a last peak is acquired as the exit time point.

10. The time point acquisition method according to claim 9, wherein the high-pass filter processing is processing of subtracting the time-series data obtained by performing moving average on the time-series data in a cycle of a natural number multiple of a basic cycle obtained from the fundamental frequency of the time-series data from the time-series data before the moving average, or is a FIR high-pass filter having a cutoff frequency lower than the fundamental frequency.

11. The time point acquisition method according to claim 10, wherein a peak having a lowest corresponding frequency, among peaks of natural resonance indicated by a result of Fourier transform on the time-series data, is set as the fundamental frequency.

12. The time point acquisition method according to claim 1, wherein the bridge is a railway bridge.

13. The time point acquisition method according to claim 1, wherein the plurality of moving vehicles is a railway vehicle that moves on the superstructure via a wheel.

14. The time point acquisition method according to claim 1, wherein at least one of an impact sensor, a pressure-sensitive sensor, a strain gauge, an image measuring device, a load cell, and a displacement gauge is also installed at the superstructure of the bridge.

15. The time point acquisition method according to claim 1, wherein the superstructure has a simple beam shape with both ends supported.

16. The time point acquisition method according to claim 1, wherein

Bridge Weigh in Motion (BWIM) is applicable to the superstructure.

17. A time point acquisition device, comprising:
a memory configured to store a program; and
a processor configured to execute the program so as to:
continuously acquire acceleration data detected by acceleration sensors, the acceleration sensors being installed at different positions along a superstructure of a bridge, the acceleration data corresponding to movement of a plurality of vehicles at the different positions as the plurality of vehicles move on the superstructure along with a formation moving vehicle;
acquire time-series data indicating a time change of a displacement of the superstructure based on the continuously acquired acceleration data;
remove a vibration component included in the time-series data;
identify first data and second data of the time-series data, the first and second data sandwiching a threshold value, the threshold value corresponding to a deflection value generated by a front part of the formation moving vehicle entering onto the superstructure; and
acquire an entry time point at which the formation moving vehicle enters the superstructure and an exit time point at which the formation moving vehicle exits from the superstructure based on the first and second data after the vibration component is removed therefrom.

18. A time point acquisition system comprising:
acceleration sensors configured to continuously acquire acceleration data, the acceleration sensors being installed at different positions along a superstructure of a bridge, the acceleration data corresponding to movement of a plurality of vehicles at the different positions as the plurality of vehicles move on the superstructure along with a formation moving vehicle; and
a time point acquisition device, the time point acquisition device including:
a memory configured to store a program; and
a processor configured to execute the program so as to:
acquire time-series data indicating a time change of a displacement of the superstructure based on the continuously acquired acceleration data;
remove a vibration component included in the time-series data;
identify first data and second data of the time-series data, the first and second data sandwiching a threshold value, the threshold value corresponding to a deflection value generated by a front part of the formation moving vehicle entering onto the superstructure; and acquire an entry time point at which the formation moving vehicle enters the superstructure and an exit time point at which the formation moving vehicle exits from the superstructure based on the first and second data after the vibration component is removed therefrom.

19. A non-transitory computer-readable storage medium storing a program for causing a computer to execute a process by a processor so as to perform the steps of:

continuously acquiring acceleration data detected by acceleration sensors, the acceleration sensors being installed at different positions along a superstructure of a bridge, the acceleration data corresponding to movement of a plurality of vehicles at the different positions as the plurality of vehicles move on the superstructure along with a formation moving vehicle;

acquiring time-series data indicating a time change of a displacement of the superstructure based on the continuously acquired acceleration data;

removing a vibration component included in the time-series data;

identifying first data and second data of the time-series data, the first and second data sandwiching a threshold value, the threshold value corresponding to a deflection value generated by a front part of the formation moving vehicle entering onto the superstructure; and acquiring an entry time point at which the formation moving vehicle enters the superstructure and an exit time point at which the formation moving vehicle exits from the superstructure based on the first and second data after the vibration component is removed therefrom.

* * * * *